United States Patent
Yamakoshi et al.

(10) Patent No.: US 12,200,324 B2
(45) Date of Patent: Jan. 14, 2025

(54) IMAGING DEVICE, IMAGING METHOD, AND ELECTRONIC DEVICE WITH COLOR FILTER VARIABLY SET TO INTERPOLATE COLOR ACQUIRED BY ANOTHER COLOR FILTER

(71) Applicant: Sony Semiconductor Solutions Corporation, Kanagawa (JP)

(72) Inventors: Hideaki Yamakoshi, Kanagawa (JP); Masashi Nakata, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 84 days.

(21) Appl. No.: 17/801,210

(22) PCT Filed: Feb. 12, 2021

(86) PCT No.: PCT/JP2021/005241
§ 371 (c)(1),
(2) Date: Aug. 19, 2022

(87) PCT Pub. No.: WO2021/172055
PCT Pub. Date: Sep. 2, 2021

(65) Prior Publication Data
US 2023/0068923 A1    Mar. 2, 2023

(30) Foreign Application Priority Data

Feb. 26, 2020 (JP) .................................. 2020-030336

(51) Int. Cl.
*H04N 23/11* (2023.01)
*H04N 23/10* (2023.01)

(52) U.S. Cl.
CPC ............. *H04N 23/11* (2023.01); *H04N 23/10* (2023.01)

(58) Field of Classification Search
CPC ........ H04N 23/11; H04N 23/10; H04N 23/45; H04N 25/131; H04N 25/135; H04N 23/13;
(Continued)

(56) References Cited

U.S. PATENT DOCUMENTS 9,494,768 B2    11/2016 Komiya
2016/0248994 A1*  8/2016 Liu ....................... A61B 5/7445
(Continued)

FOREIGN PATENT DOCUMENTS

CN          1875638 A     12/2006
CN        110050346 A      7/2019
(Continued)

OTHER PUBLICATIONS

WO 2019/181154 Translation (Year: 2019).*
International Search Report (PCT/ISA/210), International Application No. PCT/JP2021/005241, dated Apr. 27, 2021.

*Primary Examiner* — Twyler L Haskins
*Assistant Examiner* — Angel L Garces-Rivera
(74) *Attorney, Agent, or Firm* — Michael Best & Friedrich LLP

(57) ABSTRACT

The present technology relates to an imaging device, an imaging method, and an electronic device enabling to improve image quality.
Two or more imaging units capable of imaging or sensing a same subject are included, in which at least one first imaging unit among the two or more imaging units includes a first filter configured to transmit a plurality of wavelength bands, and at least another one second imaging unit other than the first imaging unit among the two or more imaging units includes a second filter capable of varying a wavelength band. The present technology can be applied to, for example, a compound-eye camera module, an imaging device includ-
(Continued)

ing a compound-eye camera module, a device that includes an imaging device and provides virtual reality or the like.

17 Claims, 26 Drawing Sheets

(58) Field of Classification Search
CPC ...... H04N 25/134; G01J 3/0256; G01J 3/027; G01J 3/26; G01J 3/2823; G01J 2003/2806; G01J 2003/2826; G02B 5/201; G02B 26/001; G02B 27/0172; G02B 5/283; G02B 2027/0114; G02B 5/204; G03B 19/22; G03B 11/00
See application file for complete search history.

(56) References Cited

U.S. PATENT DOCUMENTS

| | | | |
|---|---|---|---|
| 2018/0307906 A1 | 10/2018 | Nelson | |
| 2020/0021782 A1* | 1/2020 | Sugizaki | ........... H01L 27/14685 |
| 2021/0058591 A1 | 2/2021 | Takashima | |

FOREIGN PATENT DOCUMENTS

| | | | |
|---|---|---|---|
| JP | 2007075445 A | 3/2007 |
| JP | 2009033222 A | 2/2009 |
| JP | 2013106229 A | 5/2013 |
| JP | 2018098341 A | 6/2018 |
| WO | 2005046248 A1 | 5/2005 |
| WO | 2019003751 A1 | 1/2019 |
| WO | WO-2019181154 A1 | 9/2019 |

* cited by examiner

FIG. 15

| G1 | MS1 | G2 | MS2 |
|----|-----|----|----|
| MS3 | G3 | MS4 | G4 |
| G5 | MS5 | G6 | MS6 |
| MS7 | G7 | MS8 | G8 |

203

IMAGING DEVICE, IMAGING METHOD, AND ELECTRONIC DEVICE WITH COLOR FILTER VARIABLY SET TO INTERPOLATE COLOR ACQUIRED BY ANOTHER COLOR FILTER

TECHNICAL FIELD

The present technology relates to an imaging device, an imaging method, and an electronic device, and for example, relates to an imaging device, an imaging method, and an electronic device that perform imaging using a plurality of spectra.

BACKGROUND ART

There is known a compound-eye camera module in which a plurality of monocular camera modules is combined (see, for example, Patent Document 1).

CITATION LIST

Patent Document

Patent Document 1: Japanese Patent Application Laid-Open No. 2013-106229

SUMMARY OF THE INVENTION

Problems to be Solved by the Invention

It is desired to improve image quality or improve detection accuracy of a predetermined object, by using a compound-eye camera module.

The present technology has been made in view of such a situation, and an object thereof is to improve image quality and improve detection accuracy of a predetermined object.

Solutions to Problems

An imaging element according to one aspect of the present technology includes two or more imaging units capable of imaging or sensing a same subject, in which at least one first imaging unit among the two or more imaging units includes a first filter configured to transmit a plurality of wavelength bands, and at least another one second imaging unit other than the first imaging unit among the two or more imaging units includes a second filter capable of varying a wavelength band.

An imaging device according to one aspect of the present technology includes: an imaging device including two or more imaging units capable of imaging or sensing a same subject, in which at least one first imaging unit among the two or more imaging units includes a first filter configured to transmit a plurality of wavelength bands, and at least another one second imaging unit other than the first imaging unit among the two or more imaging units includes a second filter capable of varying a wavelength band; and a processing unit that processes a signal from the imaging device.

In an imaging method according to one aspect of the present technology, an imaging device includes two or more imaging units capable of imaging or sensing a same subject, in which at least one first imaging unit among the two or more imaging units includes a first filter configured to transmit a plurality of wavelength bands, and at least another one second imaging unit other than the first imaging unit among the two or more imaging units includes a second filter capable of varying a wavelength band, and the imaging method includes estimating the subject using a synthesized image obtained by synthesizing an image captured by the first imaging unit and an image captured by the second imaging unit.

The imaging element according to one aspect of the present technology includes two or more imaging units capable of imaging or sensing a same subject, in which at least one first imaging unit among the two or more imaging units includes a first filter configured to transmit a plurality of wavelength bands, and at least another one second imaging unit other than the first imaging unit among the two or more imaging units includes a second filter capable of varying a wavelength band.

An electronic device according to one aspect of the present technology includes the imaging device.

Note that the imaging device and the electronic device may be independent devices, or may be internal blocks that constitute one device.

BRIEF DESCRIPTION OF DRAWINGS

FIG. 15 is a view for explaining color arrangement including multispectral pixels.

MODE FOR CARRYING OUT THE INVENTION

Hereinafter, an embodiment for implementing the present technology (hereinafter, referred to as an embodiment) will be described.

<Configuration of Compound-Eye Camera Module>

Figure 1:
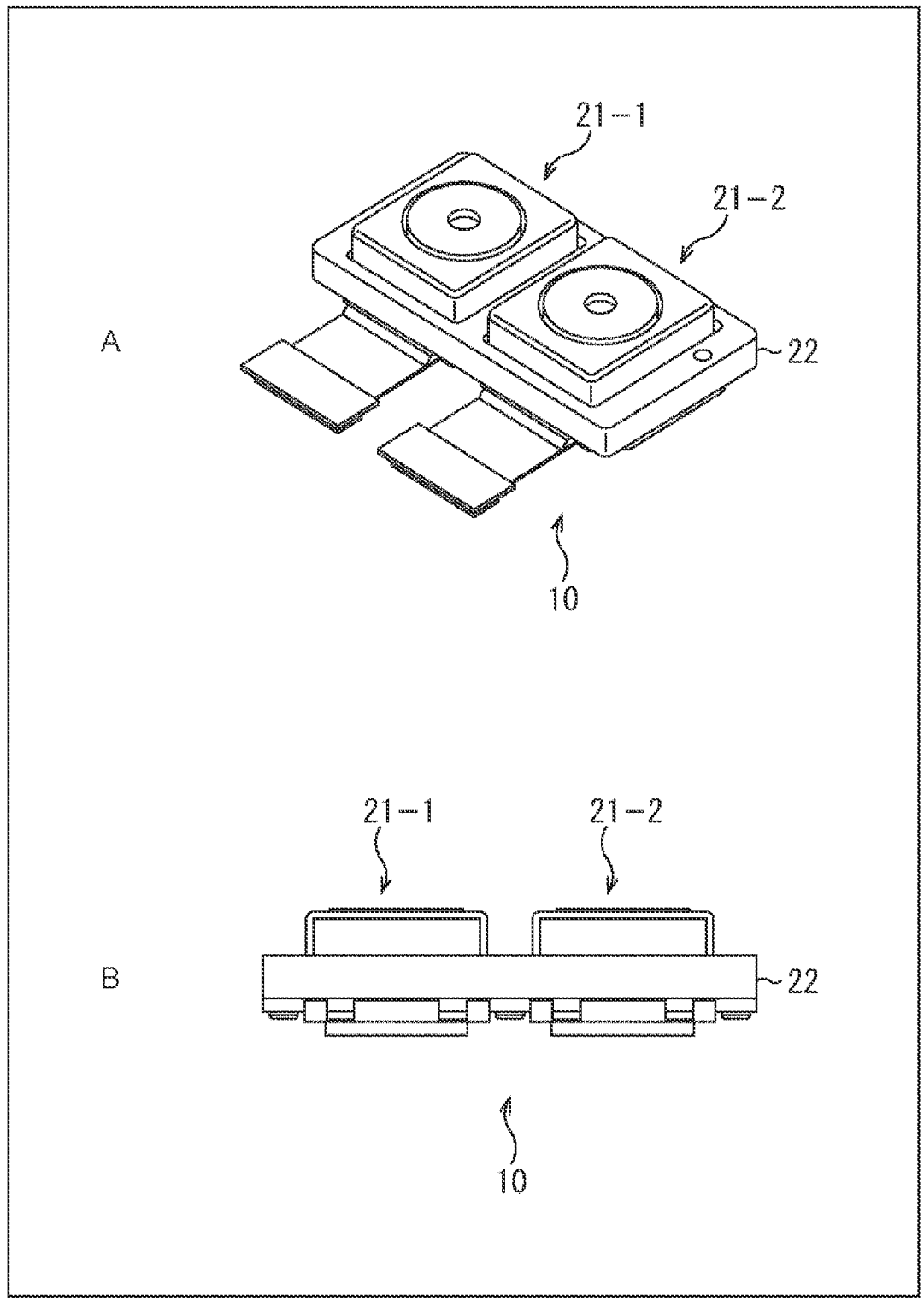
FIG. 1 is a view for explaining a configuration related to a compound eye.

The present technology can be applied to an imaging device including a compound-eye camera module. FIG. 1 is a view illustrating an external configuration example of a compound-eye camera module to which the present technology is applied.

In FIG. 1, A of FIG. 1 is a perspective view of a compound-eye camera module 10, and B of FIG. 1 is a front view of the compound-eye camera module 10.

The compound-eye camera module 10 is a camera module of a compound-eye type, and is configured by fixing a monocular camera module 21-1 and a monocular camera module 21-2 by a connecting member 22 having a rectangular plate shape.

In the monocular camera module 21-1, a solid-state imaging element such as a complementary metal oxide semiconductor (CMOS) image sensor, a lens unit, and the like are mounted.

In the monocular camera module 21-1, the solid-state imaging element includes a pixel unit in which a plurality of pixels is two-dimensionally arranged, a peripheral circuit unit that drives the pixels and performs analog/digital (A/D) conversion or the like, and the like. In this solid-state imaging element, light (image light) incident from a lens in the lens unit forms an image on a light-receiving surface of the pixel unit, and the light of the formed image is photoelectrically converted to generate a pixel signal.

Similarly to the monocular camera module 21-1, the monocular camera module 21-2 is configured by mounting a CMOS image sensor, a lens unit, and the like. For example, in the compound-eye camera module 10, the monocular camera module 21-1 can be used as a main camera, while the monocular camera module 21-2 can be used as a sub-camera.

The connecting member 22 has a rectangular plate shape having a contour larger than a size in a planar direction when the lens unit of the monocular camera module 21-1 and the lens unit of the monocular camera module 21-2 are arranged. Furthermore, a rectangular insertion hole part to be inserted with the lens unit of the monocular camera module 21-1 and a rectangular insertion hole part to be inserted with the lens unit of the monocular camera module 21-2 are symmetrically formed to penetrate the connecting member 22.

In the compound-eye camera module 10, the lens unit of the monocular camera module 21-1 and the lens unit of the monocular camera module 21-2 are respectively inserted into and fixed to two rectangular insertion hole parts formed to penetrate the connecting member 22. As a result, the compound-eye camera module 10 is configured as a camera module of a compound-eye type including the monocular camera module 21-1 and the monocular camera module 21-2.

The compound-eye camera module 10 is configured as described above.

Note that the monocular camera module 21-1 and the monocular camera module 21-2 are examples of a plurality of monocular camera modules connected by the connecting member 22, and are hereinafter simply referred to as a monocular camera module 21 in a case where it is not particularly necessary to distinguish these.

Furthermore, the monocular camera module is a camera module on which one solid-state imaging element (image sensor) is mounted. Whereas, the compound-eye camera module is a camera module in which a plurality of solid-state imaging elements (image sensors) is mounted by connecting a plurality of monocular camera modules. However, the module may be referred to as other names, such as a package.

Furthermore, here, a structure is illustrated in which the monocular camera module 21-1 and the monocular camera module 21-2 are connected by the connecting member 22 as illustrated in FIG. 1, but a case where the monocular camera module 21-1 and the monocular camera module 21-2 are simply arranged without using the connecting member 22 is also within the scope of application of the present technology.

<Configuration of Imaging Device>

Figure 2:
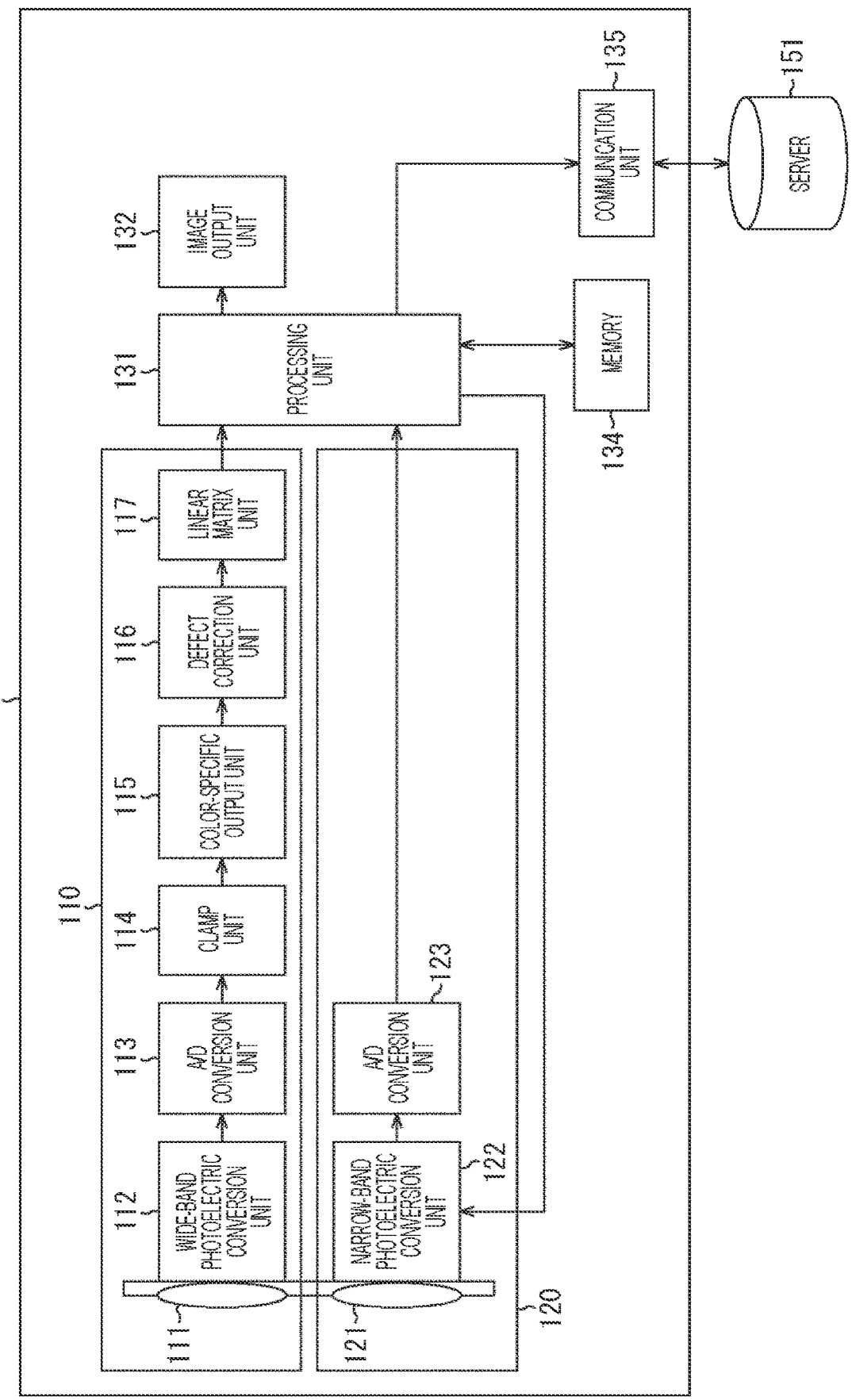
FIG. 2 is a diagram for explaining a configuration of an imaging device.

FIG. 2 is a diagram illustrating a configuration of an embodiment of an imaging device 100 including the compound-eye camera module 10 illustrated in FIG. 1.

The imaging device 100 includes an imaging unit 110 and an imaging unit 120. While details will be described later, the imaging unit 110 and the imaging unit 120 receive and process light of different wavelength bands. The description will be continued on the assumption that the different wavelength bands include, for example, a difference between a narrow band and a wide band, in addition to a difference in band such as a red wavelength and a blue wavelength. Here, the description will be continued on the assumption that the imaging unit 110 is an imaging unit that receives and processes light having a wide band wavelength, and the imaging unit 120 is an imaging unit that receives and processes light having a narrow band wavelength.

Note that, here, a case where the imaging device 100 includes the imaging unit 110 and the imaging unit 120 will be described as an example, but the imaging device may include two or more imaging units.

The imaging unit 110 corresponds to, for example, the monocular camera module 21-1 of the compound-eye camera module 10 in FIG. 1, and the imaging unit 120 corresponds to, for example, the monocular camera module 21-2 of the compound-eye camera module 10 in FIG. 1.

The imaging device 100 includes a processing unit 131 that acquires and processes a signal from the imaging unit 110 and a signal from the imaging unit 120, and an image output unit 132 that outputs an image processed by the processing unit 131. Furthermore, the imaging device 100 includes a memory 134 and a communication unit 135. The communication unit 135 is configured to be able to exchange data with a predetermined server 151 via a network (not illustrated).

The server 151 is, for example, a server on a cloud. Furthermore, instead of a configuration in which data is read from the server 151, a configuration may be adopted in which data recorded on a predetermined recording medium is read (a configuration including a drive).

The imaging unit 110 includes a lens 111, a wide-band photoelectric conversion unit 112, an A/D conversion unit 113, a clamp unit 114, a color-specific output unit 115, a defect correction unit 116, and a linear matrix unit 117.

The lens 111 condenses incident light on the wide-band photoelectric conversion unit 112. The wide-band photoelectric conversion unit 112 includes, for example, a color filter, receives and processes red (R), green (G), and blue (B) light, and outputs each signal to the A/D conversion unit 113.

The A/D conversion unit 113 converts, into a digital value, an analog signal of an image of a subject photoelectrically converted by the wide-band photoelectric conversion unit 112.

The clamp unit 114 subtracts a black level of digital data (image data) of an image of a subject supplied from the A/D conversion unit 113. The color-specific output unit 115 complements a color signal as necessary for image data supplied from the clamp unit 114. The defect correction unit 116 evaluates a defect of a pixel, and corrects the pixel evaluated as the defect as necessary in accordance with the evaluation result.

The linear matrix unit 117 applies a linear matrix to image data supplied from the defect correction unit 116 as necessary, to improve color reproduction and the like.

After the processing by the linear matrix unit 117, a block may be provided in which gamma correction processing for making luminance expression natural is performed or processing for generating a luminance signal and a chroma signal is performed, on the image data at a stage before the image data is supplied to the processing unit 131 or after the processing by the processing unit 131.

The imaging unit 110 has a function similar to that of a general camera called a digital camera, and has a function of imaging a subject and generating a color image.

The imaging unit 120 includes a lens 121 and a narrow-band photoelectric conversion unit 1522. The lens 121 condenses incident light on the narrow-band photoelectric conversion unit 1522. The narrow-band photoelectric conversion unit 1522 includes, for example, a Fabry-Perot spectrometer, receives and processes light in a predetermined wavelength band, and outputs to an A/D conversion unit 123. The A/D conversion unit 123 converts, into a digital value, an analog signal of an image of a subject photoelectrically converted by the narrow-band photoelectric conversion unit 1522, and outputs the digital value to the processing unit 131.

<Configuration of Photoelectric Conversion Unit>

Figure 3:
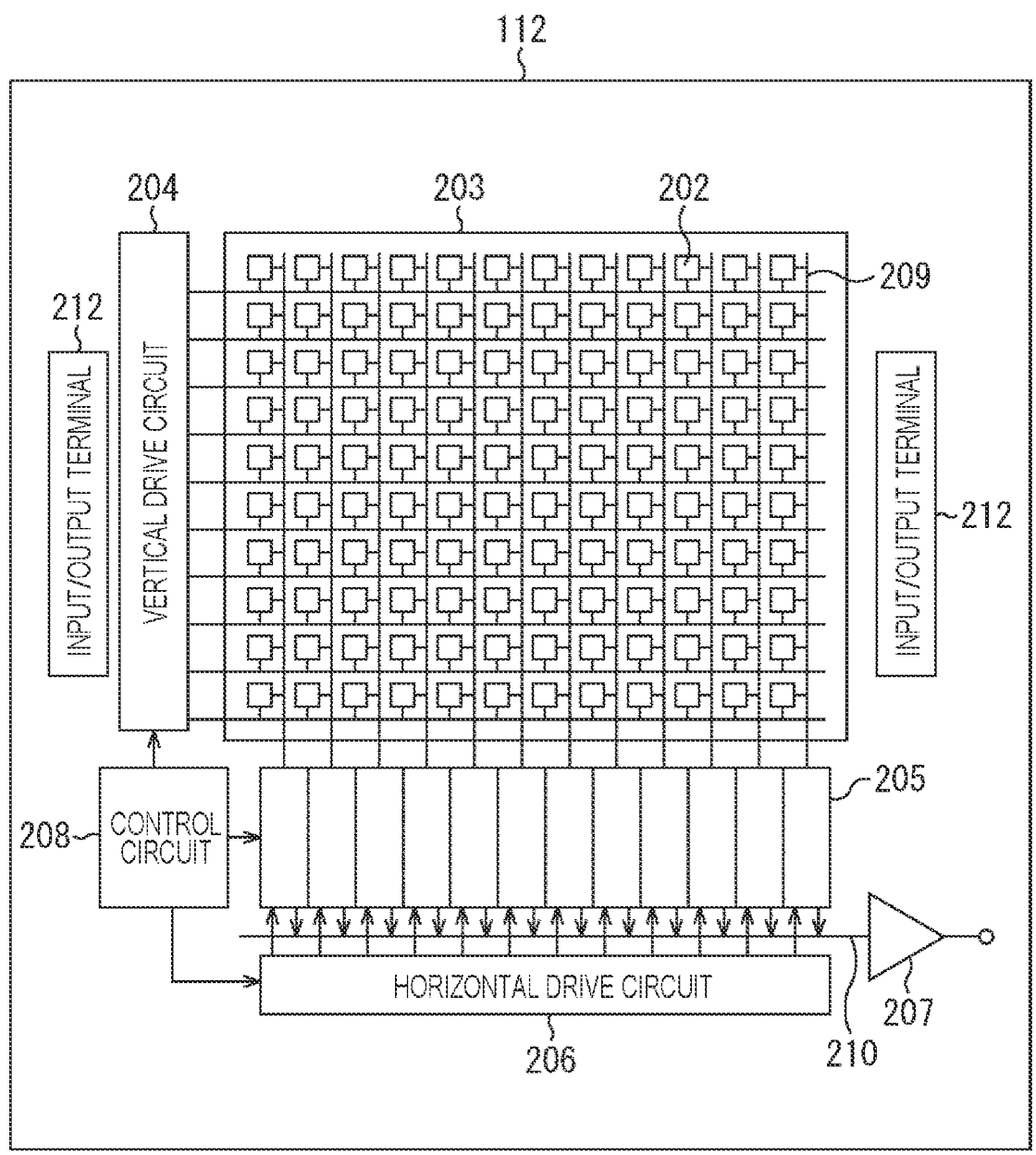
FIG. 3 is a diagram for explaining a configuration of an imaging element.

FIG. 3 is a diagram illustrating a configuration of the wide-band photoelectric conversion unit 112 and the A/D conversion unit 113. As illustrated in FIG. 3, the wide-band photoelectric conversion unit 112 includes: a pixel region 203 in which pixels 202 including a plurality of photoelectric conversion elements are regularly and two-dimensionally arranged on a semiconductor substrate (for example, a silicon substrate); and a peripheral circuit region.

The pixel 202 includes a photoelectric conversion element (for example, a photo diode (PD)) and a plurality of pixel transistors (so-called MOS transistors). The plurality of pixel transistors can be configured by, for example, three transistors of a transfer transistor, a reset transistor, and an amplification transistor, and can be configured by four transistors by further adding a selection transistor.

Furthermore, the pixel 202 may also have a pixel sharing structure. The pixel sharing structure includes a plurality of photodiodes, a plurality of transfer transistors, one shared floating diffusion, and each one shared another pixel transistor. The photodiode is a photoelectric conversion element.

The peripheral circuit region includes a vertical drive circuit 204, a column signal processing circuit 205, a horizontal drive circuit 206, an output circuit 207, and a control circuit 208.

The control circuit 208 receives an input clock and data instructing an operation mode or the like, and outputs data such as internal information of the wide-band photoelectric conversion unit 112. Specifically, the control circuit 208 generates a clock signal or a control signal serving as a reference of operations of the vertical drive circuit 204, the column signal processing circuit 205, and the horizontal drive circuit 206, on the basis of a vertical synchronization signal, a horizontal synchronization signal, and a master clock. Then, the control circuit 208 inputs these signals to the vertical drive circuit 204, the column signal processing circuit 205, and the horizontal drive circuit 206.

The vertical drive circuit 204 is configured by a shift register, for example, selects a pixel drive wiring, supplies a pulse for driving the pixel 202 to the selected pixel drive wiring, and drives the pixel 202 on a row basis. Specifically, the vertical drive circuit 204 selectively scans each pixel 202 in the pixel region 203 sequentially in a vertical direction on a row basis, and supplies a pixel signal based on a signal charge generated in accordance with an amount of received light in a photoelectric conversion element of each pixel 202, to the column signal processing circuit 205 through a vertical signal line 209.

The column signal processing circuit 205 corresponds to the A/D conversion unit 113 illustrated in FIG. 2. For example, the column signal processing circuit 205 is arranged for each column of the pixels 202, and performs, for each pixel column, signal processing such as noise removal on signals outputted from the pixels 202 of one row. Specifically, the column signal processing circuit 205 performs signal processing such as correlated double sampling (CDS) for removing fixed pattern noise unique to the pixel 202, signal amplification, and analog/digital (A/D) conversion. In an output stage of the column signal processing circuit 205, a horizontal selection switch (not illustrated) is connected and provided between with a horizontal signal line 210.

The horizontal drive circuit 206 is configured by a shift register, for example, and sequentially selects each of the column signal processing circuits 205 by sequentially outputting horizontal scanning pulses, and causes each of the column signal processing circuits 205 to output a pixel signal to the horizontal signal line 210.

The output circuit 207 performs signal processing on signals sequentially supplied from each of the column signal processing circuits 205 through the horizontal signal line 210, and outputs the signals. For example, the output circuit 207 may perform only buffering, or may perform black level adjustment, column variation correction, various types of digital signal processing (processing performed by the clamp unit 114 in FIG. 2), and the like.

An input/output terminal 212 is provided to externally exchange signals.

A basic configuration of the narrow-band photoelectric conversion unit 1522 and the A/D conversion unit 123 is similar to the configuration of the wide-band photoelectric conversion unit 112 and the A/D conversion unit 113, and can be the configuration illustrated in FIG. 3. Therefore, a description thereof is omitted here. In the following description, reference numerals of portions relating to the narrow-band photoelectric conversion unit 1522 and the A/D conversion unit 123 are added with dashes for the description. For example, the pixel region 203 of the narrow-band photoelectric conversion unit 1522 is described as a pixel region 203' with a dash.

<About Filter>

The wide-band photoelectric conversion unit 112 and the narrow-band photoelectric conversion unit 1522 include different filters. A predetermined filter is provided on the pixel region 203 (203'), and each pixel 202 (202') is configured to receive light of a predetermined wavelength band transmitted through each filter.

Figure 4:
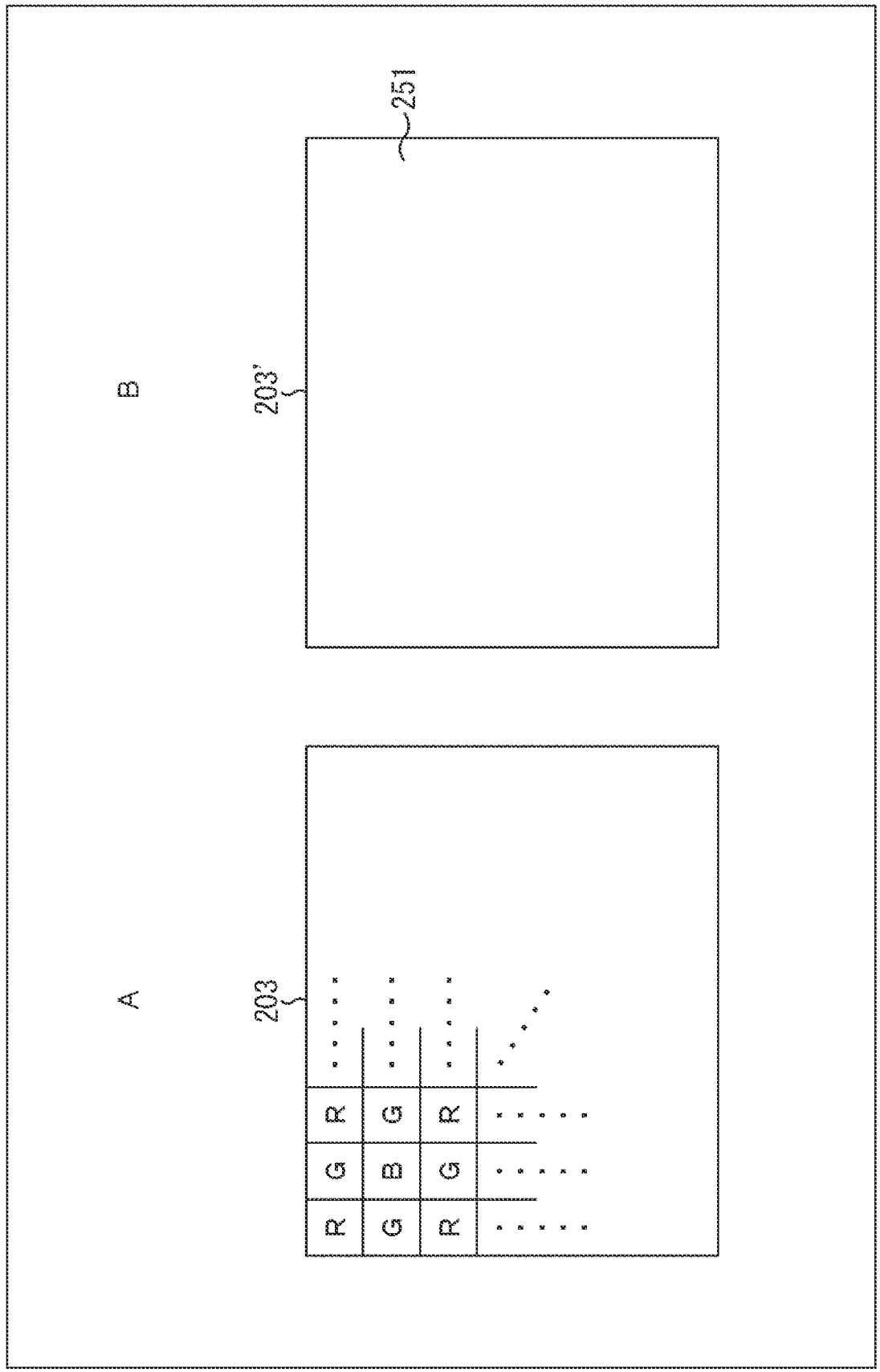
FIG. 4 is a view for explaining an arrangement of filters.

The filter of the wide-band photoelectric conversion unit 112 can be, for example, an RGB color filter as illustrated in A of FIG. 4. A of FIG. 4 illustrates an array of an RGB color filter called a Bayer array. Four pixels of 2×2 are allocated to an R pixel, a G pixel, a G pixel, and a B pixel. Furthermore, the present technology can also be applied to a case where four pixels of 2×2 are allocated to an R pixel, four pixels adjacent to the right of the R pixel are allocated to a G pixel, four pixels on a lower side of the R pixel are allocated to a G pixel, and four pixels adjacent to the right of the G pixel are allocated to a B pixel.

Furthermore, one of the two G pixels may be arranged as a transparent (white) pixel. Furthermore, here, the description will be continued with RGB as an example, but other filters such as a filter including each color of cyan (Cy), magenta (Mg), yellow (Ye), and white (W) may be used.

Furthermore, a filter other than the color filter, for example, a filter called a plasmon filter can also be used. While any filter may be used, the filter of the wide-band photoelectric conversion unit 112 is a filter that receives (transmits) light having a wide-band wavelength. In a case where the wide-band photoelectric conversion unit 112 is configured by the RGB color filter, the wide-band photoelectric conversion unit 112 functions as a photoelectric conversion unit that transmits and processes light in a wavelength band from blue (B) to red (R), for example, a wavelength band of 400 nm to 700 nm.

The narrow-band photoelectric conversion unit 1522 handles a wavelength band in a range narrower than the wavelength band handled by the wide-band photoelectric conversion unit 112. The narrow-band photoelectric conversion unit 1522 includes a filter that transmits light in a wavelength band in a predetermined range. As the filter, for example, a filter called a Fabry-Perot spectrometer (interferometer) or the like can be used. In a case where the Fabry-Perot spectrometer is used, as illustrated in B of FIG. 4, a Fabry-Perot spectrometer 251 is arranged on the pixel region 203' of the narrow-band photoelectric conversion unit 1522 so as to cover all the pixels.

Figure 5:
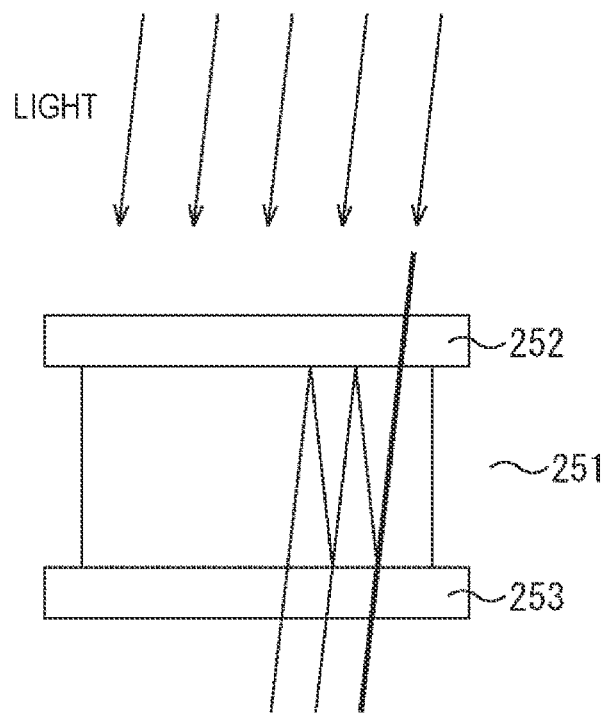
FIG. 5 is a view for explaining a Fabry-Perot spectrometer.

The Fabry-Perot spectrometer 251 will be described with reference to FIG. 5. The Fabry-Perot spectrometer 251 can be used as a filter that transmits light of a specific wavelength. As illustrated in FIG. 4, the Fabry-Perot spectrometer 251 is an optical device including two semitransparent mirrors 252 and 253, and the two semitransparent mirrors 252 and 253 are arranged to face each other and be parallel to each other. The semitransparent mirrors 252 and 253 are finished into reflecting surfaces having high reflectance and slight transmittance.

Light incident from one side (an upper side in the figure) of the Fabry-Perot spectrometer 251 is reflected and reciprocated many times between both reflecting surfaces to interfere with each other. Light transmitted through the semitransparent mirror 253 becomes interference light having a considerable length due to light reciprocated many times with a constant optical path difference. Therefore, when this is used as a spectrometer, a very high resolution can be obtained.

That is, a wavelength desired to be analyzed by the Fabry-Perot spectrometer 251 can be selected from incident light, and the selected light can be received by the pixel 202'.

As described above, the Fabry-Perot spectrometer 251 is configured such that, by the light being reflected and reciprocated between the semitransparent mirror 252 and the semitransparent mirror 253 and interfering with each other, light of a predetermined wavelength is transmitted. The wavelength of light to be transmitted can be set by a distance between the semitransparent mirror 252 and the semitransparent mirror 253. In other words, by changing the distance between the semitransparent mirror 252 and the semitransparent mirror 253, light having a wavelength to be transmitted can be transmitted.

For example, a voltage can be applied to the semitransparent mirror 252 and the semitransparent mirror 253, and the distance between the semitransparent mirror 252 and the semitransparent mirror 253 can be adjusted by electrostatic attraction. Such a Fabry-Perot spectrometer capable of varying a wavelength band of light to be transmitted is called a micro electro mechanical systems (MEMS) Fabry-Perot spectrometer or the like. Here, as an example, a case will be described in which a MEMS Fabry-Perot spectrometer capable of variably setting a wavelength band of light to be transmitted to a desired wavelength band is used as the Fabry-Perot spectrometer 251. Note that, also in the following description, the description will be continued in which the MEMS Fabry-Perot spectrometer will be simply referred to as the Fabry-Perot spectrometer 251.

In a case where the Fabry-Perot spectrometer 251 is used as the filter of the narrow-band photoelectric conversion unit 1522, as illustrated in B of FIG. 4, the Fabry-Perot spectrometer 251 covering the entire surface of the pixel region 203' may be arranged.

Figure 6:
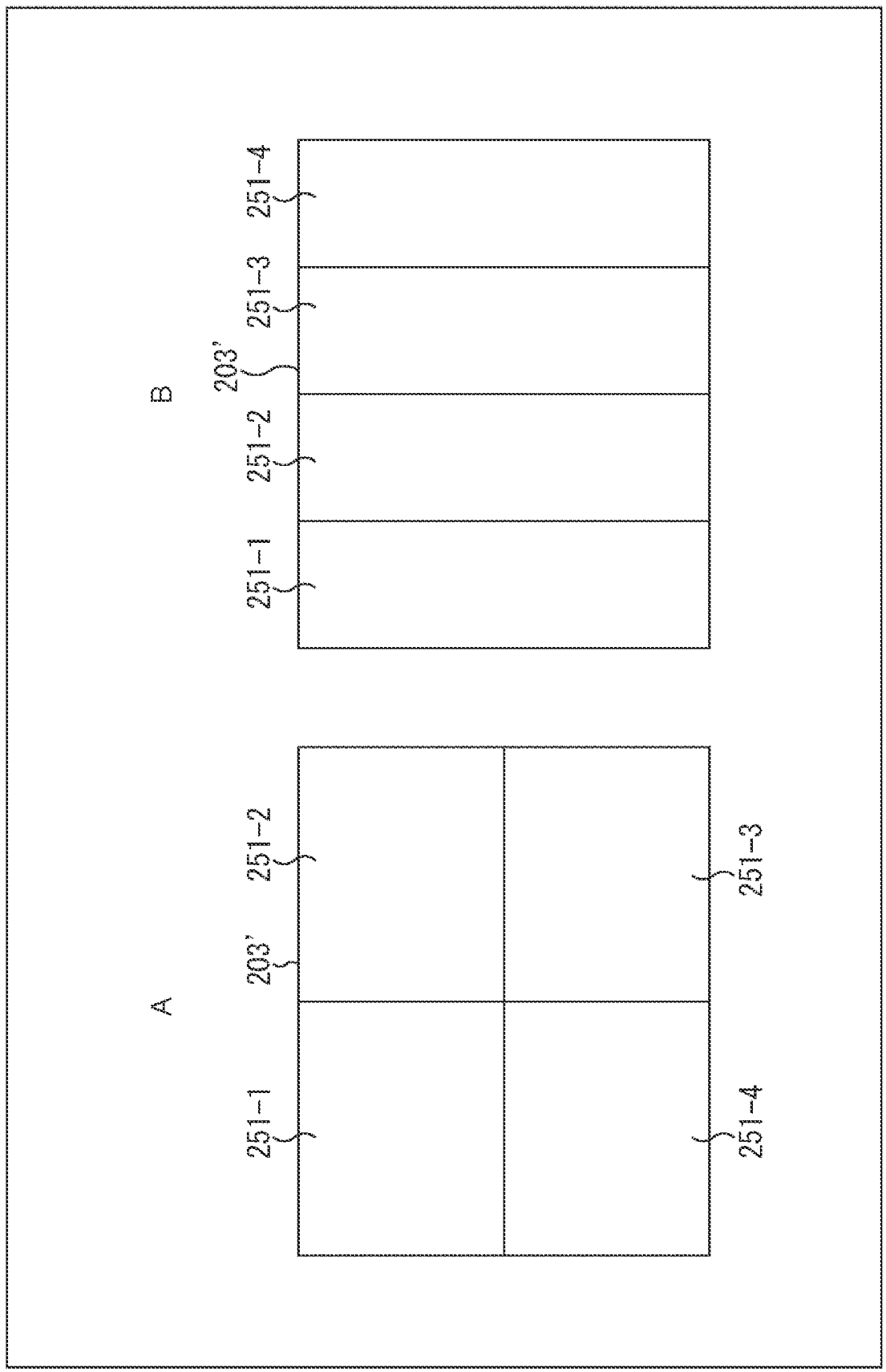
FIG. 6 is a view for explaining an arrangement of the Fabry-Perot spectrometer.

Furthermore, as illustrated in A of FIG. 6, a configuration may be adopted in which the pixel region 203' is divided into four regions of 2×2, and Fabry-Perot spectrometers 251-1 to 251-4 are arranged in the respective regions. Furthermore, as illustrated in A of FIG. 6, a configuration may be adopted in which the pixel region 203' is divided into four regions in a vertical direction, and the Fabry-Perot spectrometers 251-1 to 251-4 are arranged in the respective regions.

Although not illustrated, a configuration may be adopted in which the pixel region 203' is divided into four regions in a horizontal direction, and the Fabry-Perot spectrometers 251-1 to 251-4 are arranged in the respective regions. The number of divisions may be any number, and a configuration may be adopted in which a plurality of Fabry-Perot spectrometers 251 is arranged in the pixel region 203' in accordance with the number of divisions. Furthermore, a configuration may be adopted in which the Fabry-Perot spectrometer 251 is provided for each pixel 202'.

As described with reference to FIG. 4, in the Fabry-Perot spectrometer 251, a wavelength of light to be transmitted is set according to a distance between the two semitransparent mirrors 252 and 253, but the distance between the two semitransparent mirrors is not always uniform. For example, in a central portion of the Fabry-Perot spectrometer 251, the semitransparent mirror 252 may be loosened, and a distance between the semitransparent mirror 252 and the semitransparent mirror 253 may be shorter than a distance between the semitransparent mirror 252 and the semitransparent mirror 253 at an end portion.

In order to prevent such a situation, a plurality of Fabry-Perot spectrometers 251 as described with reference to FIG. 6 may be arranged in order to reduce an area per semitransparent mirror and prevent the central portion from being loosened. Furthermore, while details will be described later, by applying the present technology, even if one Fabry-Perot spectrometer 251 is provided in the pixel region 203' as in B of FIG. 4, it is possible to appropriately perform correction and processing even if the distance between the two semitransparent mirrors 252 and 253 of the Fabry-Perot spectrometer 251 is not uniform.

In the following description, a case where one Fabry-Perot spectrometer 251 is provided in the pixel region 203' as in B of FIG. 4 will be described as an example.

In this way, the imaging unit 110 includes the wide-band photoelectric conversion unit 112, and the wide-band photoelectric conversion unit 112 receives and processes light having a wide-band wavelength of a color filter or the like, and generates a color image. In the following description, the imaging unit 110 will be appropriately described as a wide-band imaging unit 110.

The imaging unit 120 includes the narrow-band photoelectric conversion unit 1522, and the narrow-band photoelectric conversion unit 1522 receives and processes light of a narrow-band wavelength of the Fabry-Perot spectrometer 251 or the like, and generates an image. In the following description, the imaging unit 120 will be appropriately described as a narrow-band imaging unit 120.

Figure 7:
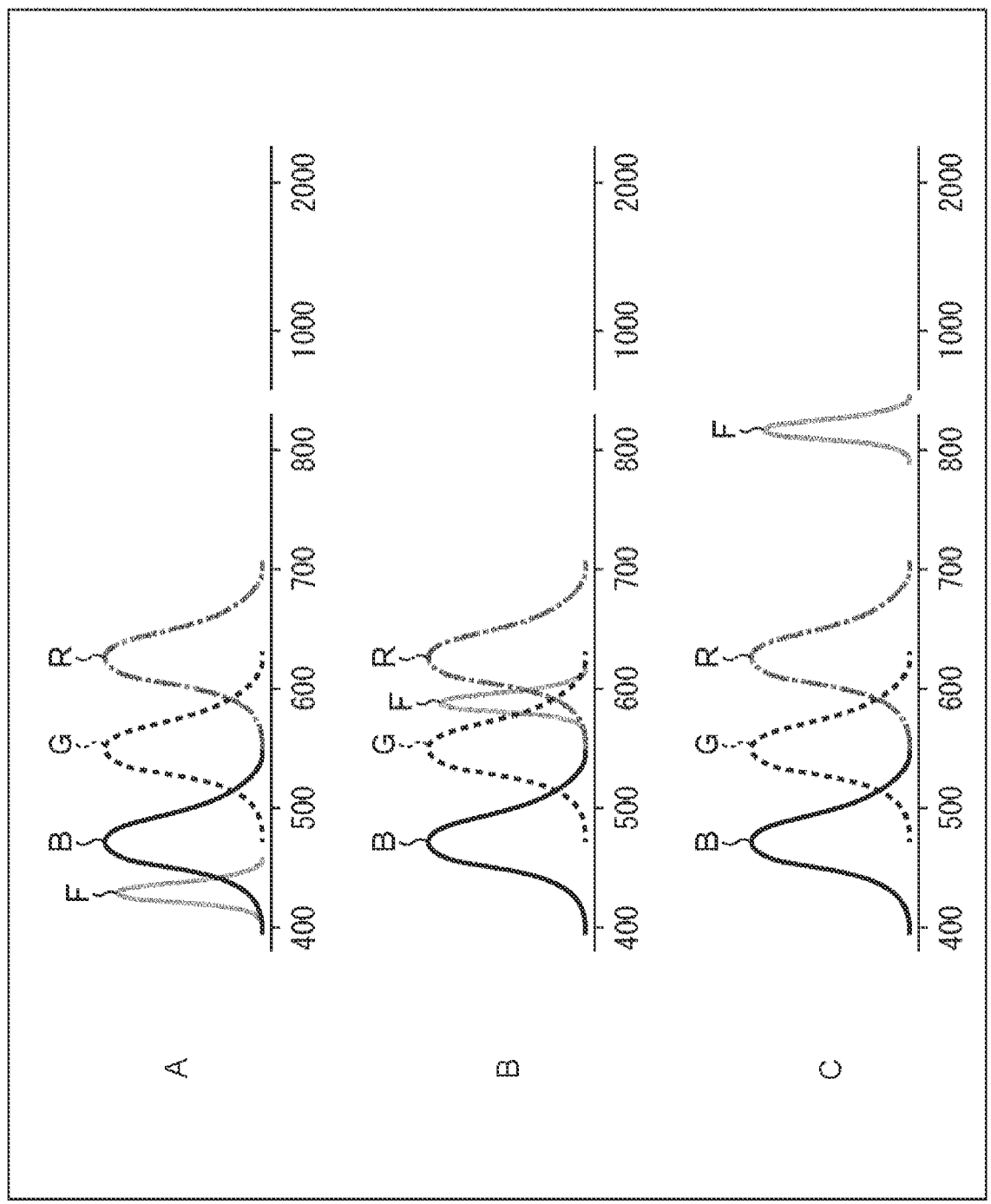
FIG. 7 is a view for explaining wavelength bands of colors to be interpolated.

Since the imaging device 100 includes the wide-band imaging unit 110 and the narrow-band imaging unit 120, it is possible to receive and process light in a wavelength band as illustrated in FIG. 7. When A to C of FIG. 7 are referred to, the wide-band imaging unit 110 receives and processes light of a blue (B) wavelength band B, light of a green (G) wavelength band G, and light of a red (R) wavelength band R.

Since the narrow-band imaging unit 120 can set a wavelength band desired to be received and processed, it is possible to set the wavelength band in accordance with a subject desired to be imaged or a purpose. In A of FIG. 7, a wavelength band set as the wavelength band of light to be transmitted through the Fabry-Perot spectrometer 251 is a wavelength band F of a wavelength shorter than blue, for example, the wavelength band F of purple (ultraviolet).

Furthermore, a half-value width of the wavelength band F of the Fabry-Perot spectrometer 251 is smaller than a half-value width of the wavelength band of the color filter, for example, smaller than a half-value width of the wavelength band B. That is, also in this respect, the Fabry-Perot spectrometer 251 can be said to be a filter that transmits a wavelength of a narrow band, and is a filter that can selectively transmit light of a desired wavelength.

As illustrated in A of FIG. 7, in a case where the wavelength band F of ultraviolet light is imaged by the narrow-band imaging unit 120, for example, imaging in a wavelength band suitable for human skin analysis can be performed. For example, a pigmented spot on a person's face can be imaged by the narrow-band imaging unit 120, and an image can be provided to the user in which the pigmented spot is superimposed on a color image of the face imaged by the wide-band imaging unit 110.

In a case of imaging a skin condition such as a pigmented spot, imaging in a wavelength band of an ultraviolet ray can be performed with higher sensitivity than imaging in a wavelength band of a visible light region (the wavelength bands R, G, and B). Therefore, by imaging the skin condition by the narrow-band imaging unit 120, the sensitivity of such imaging of the skin condition can be improved.

Furthermore, the present technology can be applied not only to analysis of a skin condition such as a pigmented spot but also, for example, imaging for detecting an unapplied region of cosmetics such as a sunscreen. For example, the imaging device 100 to which the present technology is applied can be mounted on a smartphone or the like, and an application for imaging the user's face, detecting an unapplied region of cosmetics, and notifying the user can be provided.

Furthermore, in a case where ultraviolet light is captured by the narrow-band imaging unit 120, an amount of ultraviolet light of external light can be measured by analyzing the captured image, and an alarm can be issued in accordance with the measurement value.

In the example illustrated in B of FIG. 7, the wavelength band set as the wavelength band of light to be transmitted through the Fabry-Perot spectrometer 251 is the wavelength band F between the green wavelength band G and the red wavelength band R, for example, a yellow wavelength band F.

As illustrated in B of FIG. 7, in a case where the yellow wavelength band F is imaged by the narrow-band imaging unit 120, color reproducibility can be improved. By synthesizing an image captured by the wide-band imaging unit 110 including the RGB color filter and an image captured by the narrow-band imaging unit 120 including the Fabry-Perot spectrometer 251, it is possible to improve color reproduction and obtain an image with improved image quality.

The narrow-band imaging unit 120 can image a color whose color reproducibility is degraded in an image captured by the wide-band imaging unit 110. In other words, the color can be supplemented by the narrow-band imaging unit 120. In B of FIG. 7, a case where a color of the wavelength band F between the green wavelength band G and the red wavelength band R is supplemented by the narrow-band imaging unit 120 is taken as an example, but the wavelength band F may be changed and other colors may be supplemented.

By the narrow-band imaging unit 120 capturing and supplementing a color whose color reproducibility is degraded in an image captured by the wide-band imaging unit 110, for example, reproducibility of a color of human skin can be further improved, and a person can be captured more exactly.

Furthermore, the present technology can also be applied to a case of performing person recognition utilizing the skin color discrimination ability, detection of a change in health condition, and the like. Furthermore, the present technology can also be applied to a case where the imaging device 100 is mounted on a medical smart glass or the like to assist medical examination and improve a diagnosis system. For example, an image obtained by superimposing a color image and an image captured in the wavelength band F suitable for imaging a shadow around the eye, jaundice, or the like can be presented to a physician.

As illustrated in C of FIG. 7, in a case where the narrow-band imaging unit 120 is adapted to image the wavelength band F of infrared light, for example, an object or foreign matter can be detected. For example, it is possible to identify different objects having the same color that are difficult to distinguish in the visible light region, by analyzing an image captured in the wavelength band F of infrared light by the narrow-band imaging unit 120.

Furthermore, the present technology can also be applied to a state of a content amount in paper or plastic packaging, a damaged state of food, a health state of a plant, and the like, as an object to be detected. Furthermore, the imaging device 100 can also be used for smart glasses or a smart home, and used in a case where, for example, a high-temperature object is detected and an alarm is sounded.

<First Processing of Imaging Device 100>

Figure 8:
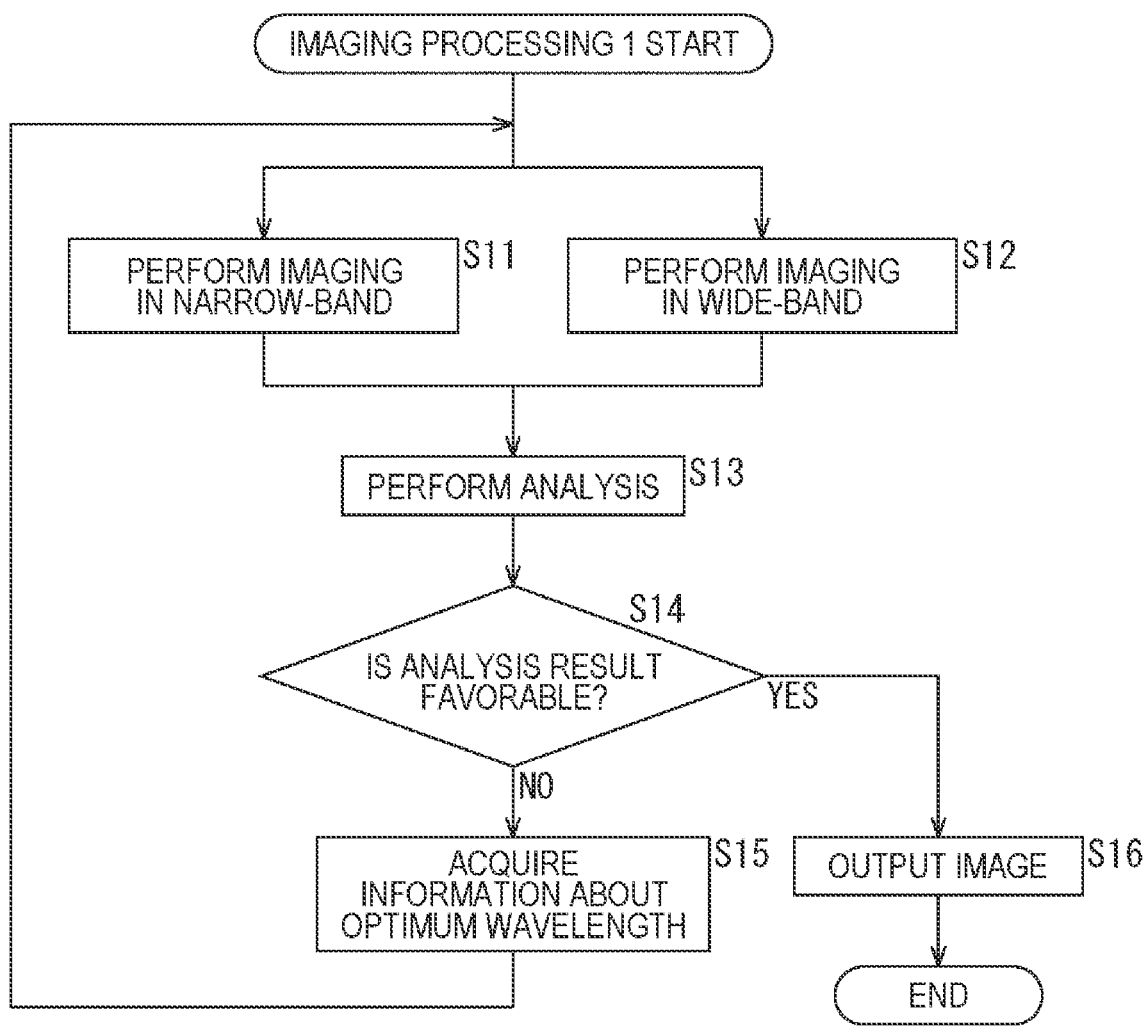
FIG. 8 is a flowchart for explaining imaging processing 1.

First processing of the imaging device 100 will be described with reference to a flowchart of FIG. 8.

In step S11, the narrow-band imaging unit 120 performs imaging in which the wavelength band of light to be transmitted by the Fabry-Perot spectrometer 251 is set to a predetermined wavelength band (appropriately described as a first wavelength band). In synchronization with the imaging of the narrow-band imaging unit 120, the wide-band imaging unit 110 also performs imaging (step S12).

In step S13, the processing unit 131 performs analysis. The processing unit 131 performs analysis suitable for an imaging purpose. For example, in a case where a skin condition is analyzed as described with reference to A of FIG. 7, analysis suitable for the purpose of analyzing the skin condition is performed. The analysis suitable for the purpose of analyzing the skin condition includes analysis as to whether or not imaging has been performed in a wavelength band suitable for imaging a pigmented spot.

Furthermore, in a case where the narrow-band imaging unit 120 performs imaging for supplementing a color in order to improve reproducibility of a skin color, analysis is included as to whether or not the supplementing color is appropriate, which is analysis as to whether or not the wavelength band of the supplementing color is set.

A configuration may be adopted in which a required image is supplied to the processing unit 131, in a case where such analysis is performed, in other words, in a case where it is analyzed (determined) as to whether or not imaging in a state set to an optimum wavelength band has been performed.

For example, a configuration may be adopted in which the analysis is performed using only an image from the narrow-band imaging unit 120. In a case of such a configuration, it is possible to obtain a processing flow in which the imaging processing in the wide-band imaging unit 110 in step S12 is omitted.

Furthermore, for example, a configuration may be adopted in which the analysis is performed using only an image from the wide-band imaging unit 110. In a case of such a configuration, it is possible to obtain a processing flow in which the imaging processing in the narrow-band imaging unit 120 in step S11 is omitted.

Furthermore, for example, a configuration may be adopted in which the analysis is performed using an image from the narrow-band imaging unit 120 and an image from the wide-band imaging unit 110. In a case of such a configuration, processing of synthesizing the image from the narrow-band imaging unit 120 and the image from the wide-band imaging unit 110 is performed by the processing unit 131, and analysis is performed using the synthesized image.

Whether to perform analysis by using the synthesized image obtained by synthesizing the image from the narrow-band imaging unit 120 and the image from the wide-band imaging unit 110, to perform analysis by using only the image from the narrow-band imaging unit 120, or to perform analysis by using only the image from the wide-band imaging unit 110, is only necessary to be set such that an image that allows most accurate analysis is used, in accordance with an analysis content.

Furthermore, whether to perform analysis using the synthesized image, to perform analysis using only the image from the narrow-band imaging unit 120, or to perform analysis using only the image from the wide-band imaging unit 110 may be switched in accordance with the analysis content.

With use of a result of the analysis in step S13, determination in step S14 is performed. In step S14, it is determined whether or not the analysis result is favorable.

For example, in a case of analyzing a skin condition, it is determined whether or not a skin condition such as a pigmented spot has been successfully imaged. Furthermore, for example, in a case of analyzing a skin color, it is determined whether or not imaging has been successfully performed in a state where reproducibility of a skin color is high. In other words, such determination is determination of whether or not imaging has been performed in an appropriate wavelength band.

In a case where it is determined in step S14 that the analysis result is not favorable, in other words, in a case where it is determined that imaging is not performed in an appropriate wavelength band, the process proceeds to step S15.

In step S15, information regarding an optimum wavelength is acquired. In a case where it is determined that the analysis result is not favorable, the processing unit 131 reads information about an optimum wavelength band from data stored in the memory 134 (FIG. 2). Alternatively, the processing unit 131 controls the communication unit 135, accesses the server 151, and reads information about an optimum wavelength band from data stored in the server 151.

For example, a wavelength band suitable for imaging a skin condition (whether or not there is a pigmented spot, or the like) and a wavelength band suitable for imaging for improving reproducibility of a skin color are different depending on a race, age, gender, and the like. For example, in steps S11 to S13, by performing imaging in a preset first wavelength band and analyzing an image captured in the first wavelength band, a race, age, gender, and the like of a subject can be specified, and information regarding an optimum wavelength based on the specified information can be read.

In such a case, the memory 134 and the server 151 store data in which the race, the age, the gender, and the optimum wavelength of the subject are associated with each other. Such data may be data obtained by learning and may be updated.

When the information regarding the optimum wavelength is acquired in step S15, the wavelength band of the Fabry-Perot spectrometer 251 of the narrow-band photoelectric conversion unit 1522 (appropriately described as a second wavelength band) is set to the wavelength band based on the information. Thereafter, the process returns to step S11, and imaging in the set second wavelength band is performed, so that the processes in and after step S11 are repeated.

Whereas, in a case where it is determined in step S14 that the analysis result has been favorable, in other words, in a case where it is determined that imaging in an optimum wavelength band has been performed, the process proceeds to step S16.

In step S16, the processing unit 131 synthesizes the image from the narrow-band imaging unit 120 and the image from the wide-band imaging unit 110, and outputs the image to a display unit, a recording unit, or the like (not illustrated) via the image output unit 132.

In a case where the analysis using the synthesized image is performed in step S13, the synthesized image also used for the analysis can be outputted. Furthermore, in a case where the analysis itself is performed using only the image from the narrow-band imaging unit 120 or the wide-band imaging unit 110, the synthesized image is outputted after the processing of generating the synthesized image is executed.

Furthermore, the image from the narrow-band imaging unit 120 and the image from the wide-band imaging unit 110 may be acquired by performing imaging again with the narrow-band imaging unit 120 in the optimum wavelength band and performing imaging with the wide-band imaging unit 110 as well in synchronization with the imaging, and a synthesized image may be generated and outputted.

When the synthesized image is generated, color correction based on the analysis result may be performed, and the synthesized image subjected to the color correction may be outputted. For example, when improving reproducibility of a skin color, color correction for improving the reproducibility of the skin color may be performed on the basis of information at the time of analysis. Further, control data for performing the color correction may be read from the memory 134 or the server 151 together, for example, when the information regarding the optimum wavelength is read in step S15.

<Second Processing of Imaging Device 100>

Second processing of the imaging device 100 will be described with reference to a flowchart of FIG. 9.

In step S31, the narrow-band imaging unit 120 sequentially changes a wavelength band of light to be transmitted by the Fabry-Perot spectrometer 251 and performs imaging a plurality of times. In synchronization with the imaging of the narrow-band imaging unit 120, the wide-band imaging unit 110 also performs imaging a plurality of times (step S32).

In step S33, a subject is estimated. The subject may be estimated using a synthesized image obtained by synthesizing an image from the narrow-band imaging unit 120 and an image from the wide-band imaging unit 110, or using only either one of the image from the narrow-band imaging unit 120 and the image from the wide-band imaging unit 110.

With use of an estimation result of the subject in step S33, determination in step S34 is performed. That is, in step S34, it is determined whether or not the subject has been successfully estimated. In a case where it is determined in step S34 that the subject has been successfully estimated, the process proceeds to step S35.

In step S35, information regarding an optimum wavelength is acquired. The information acquired in step S35 is information regarding a wavelength suitable for imaging the estimated subject, which is a wavelength corresponding to a color to be interpolated for improving image quality.

For example, as a result of analyzing a captured image, in a case where it is analyzed that a person's face occupies a wide area in the image, information about a wavelength band for a skin color of the person is read from the memory 134 or the server 151 (FIG. 2). By comparing the read information about the wavelength band, a color of the person's face portion in the image from the narrow-band imaging unit 120, and a color of the image from the wide-band imaging unit 110, the wavelength band to be imaged by the narrow-band imaging unit 120 is set.

Since a skin color of a person varies depending on a race, gender, or the like, a plurality of pieces of information is read. Then, since the narrow-band imaging unit 120 performs imaging in different wavelength bands, and the wide-band imaging unit 110 also performs imaging a plurality of times in synchronization with the imaging of the narrow-band imaging unit 120, a plurality of images is obtained from the narrow-band imaging unit 120 and the wide-band imaging unit 110.

For example, by comparing a color of the person's face portion in the image from the narrow-band imaging unit 120 with a color of the image from the wide-band imaging unit 110, a rough skin color is determined (a race is determined), and information about a wavelength band suitable for imaging the skin color is selected.

The subject can be estimated by acquiring data from the server 151 on a cloud and using the data. Furthermore, such data may be stored in the memory 134 in advance or at a predetermined timing, and data stored in the memory 134 may be used.

Furthermore, the subject may be set by a user. For example, in a case of analyzing a pigmented spot, the subject is a person (a face). Therefore, in a case of analyzing a skin condition, the processing may be performed assuming that the person (the face) is set as the subject. Furthermore, the processing related to the estimation of the subject may be performed on the basis of an AI function.

In step S36, a wavelength band of the Fabry-Perot spectrometer 251 is set on the basis of the information regarding the optimum wavelength acquired in the process in step S35, and imaging in the optimum wavelength band is performed by the narrow-band imaging unit 120. Furthermore, imaging is also performed in the wide-band imaging unit 110 in synchronization with this imaging.

In step S37, the image from the narrow-band imaging unit 120 captured in the optimum wavelength band and the image from the wide-band imaging unit 110 captured in synchronization with the imaging of the narrow-band imaging unit 120 are synthesized and outputted.

Whereas, in a case where it is determined in step S34 that estimation of the subject has failed, the process proceeds to step S37, and a synthesized image is generated and outputted. In this case, since a plurality of images has been captured in the processes of steps S31 and S32, a plurality of synthesized images can be generated. All of the plurality of synthesized images may be outputted, or an image determined to be best captured may be selected and outputted.

In this way, when the subject is estimated, imaging is performed in a wavelength band of a color to be interpolated in which the image of the subject is best captured.

Note that, for example, the processes of steps S31 to S36 may be repeated a plurality of times. For example, the subject is specified by executing the processes of steps S31 to S36 for the first time. In a case where the subject is specified as a person, for example, in the processes of steps S31 to S36 for the second time, a skin color of the subject is specified by performing imaging a plurality of times while changing the wavelength band for imaging in the wavelength band for a human skin color. Then, a wavelength band optimum for the skin color of the specified subject is set, and final imaging is performed.

In this way, by repeating the processes a plurality of times, it is possible to obtain a processing flow in which a wavelength band suitable for the subject can be set more accurately.

Similarly to the first processing, also in the second processing, when the synthesized image is generated, color correction based on the analysis result may be performed, and the synthesized image subjected to the color correction may be outputted. For example, when improving reproducibility of a skin color, color correction for improving the reproducibility of the skin color may be performed on the basis of information at the time of analysis. Further, control data for performing the color correction may be read from the memory 134 or the server 151 together, for example, when the information regarding the optimum wavelength is read in step S35.

<Third Processing of Imaging Device 100>

Figure 10:
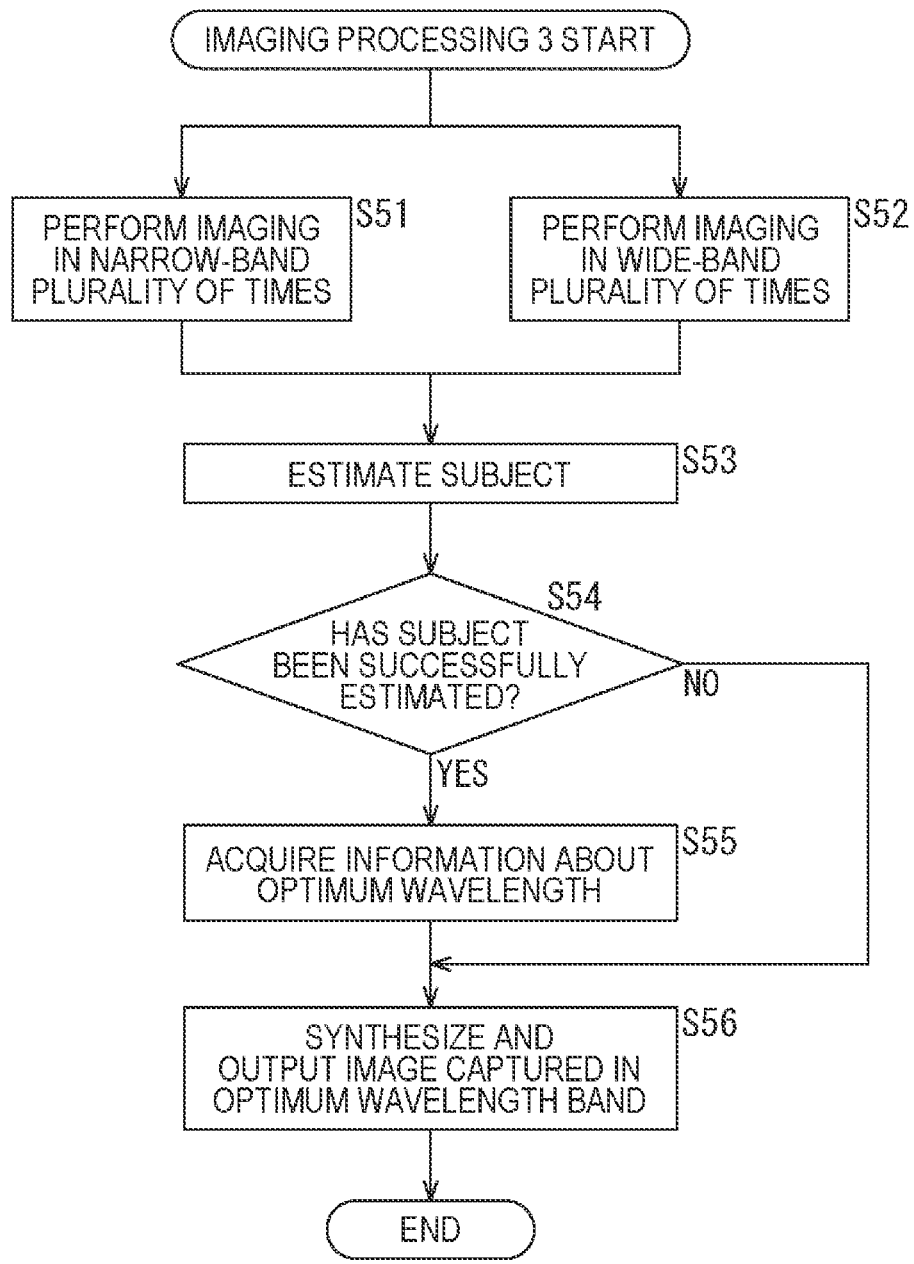
FIG. 10 is a flowchart for explaining imaging processing 3.

Third processing of the imaging device 100 will be additionally described with reference to a flowchart of FIG. 10.

Figure 9:
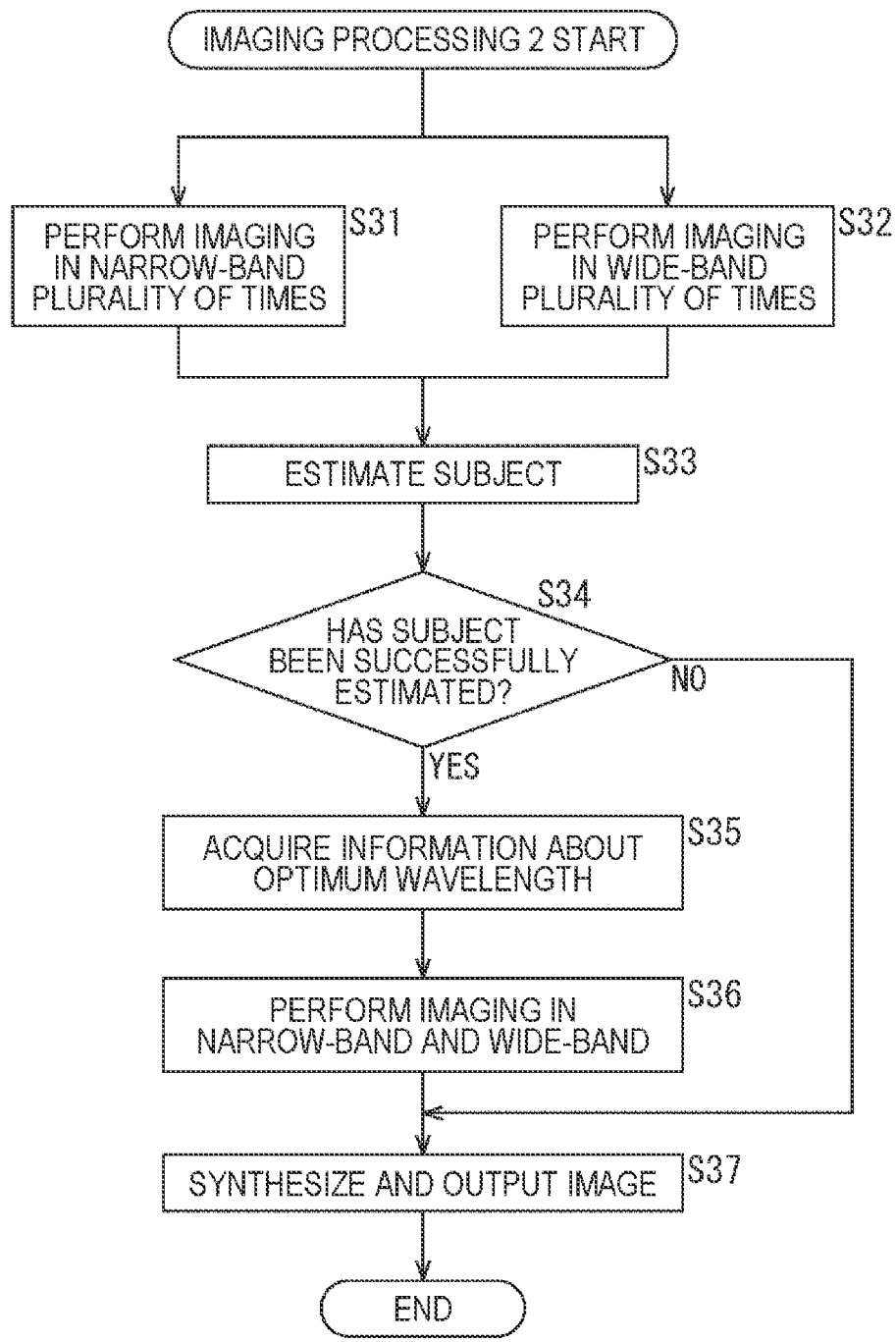
FIG. 9 is a flowchart for explaining imaging processing 2.

The third processing of the imaging device 100 is different from the second processing in that the process of step S36 in which the imaging set with the optimum wavelength is performed again is omitted from the second processing with reference to the flowchart of FIG. 9. Other points are similar to those of the second processing, and thus a description thereof will be appropriately omitted since the description thereof overlaps.

In step S51, the narrow-band imaging unit 120 sequentially changes a wavelength band of light to be transmitted by the Fabry-Perot spectrometer 251 and performs imaging a plurality of times. In synchronization with the imaging of the narrow-band imaging unit 120, the wide-band imaging unit 110 also performs imaging a plurality of times (step S52).

In step S53, a subject is estimated. With use of an estimation result of the subject in step S53, determination in step 354 is performed. That is, in step S54, it is determined whether or not the subject has been successfully estimated. In a case where it is determined in step 354 that the subject has been successfully estimated, the process proceeds to step 355.

In step S55, information regarding an optimum wavelength is acquired. The information acquired in step S55 is information regarding a wavelength suitable for imaging the estimated subject, which is a wavelength corresponding to a color to be interpolated for improving image quality.

In step S56, an image of the narrow-band imaging unit 120 captured in the wavelength band closest to the optimum wavelength band is selected on the basis of the information regarding the optimum wavelength acquired in the process in step 355. Then, when the selected image is captured, the selected image is synthesized with the image captured by the wide-band imaging unit 110 and outputted.

Whereas, in a case where it is determined in step S54 that estimation of the subject has failed, the process proceeds to step S56, and a synthesized image is generated and outputted. In this case, since a plurality of images has been captured in the processes of steps S51 and S52, a plurality of synthesized images can be generated. All of the plurality of synthesized images may be outputted, or an image determined to be best captured may be selected and outputted.

In this way, when the subject is estimated, an image is selected which is captured in a wavelength band of a color to be interpolated in which the image of the subject is best captured.

Similarly to the first and second processing, also in the third processing, when the synthesized image is generated, color correction based on an analysis result may be performed, and the synthesized image subjected to the color correction may be outputted. For example, when improving reproducibility of a skin color, color correction for improving the reproducibility of the skin color may be performed on the basis of information at the time of analysis. Further, control data for performing the color correction may be read from the memory 134 or the server 151 together, for example, when the information regarding the optimum wavelength is read in step S55.

<Other Processing>

In the processing of the imaging device 100 described above, the narrow-band imaging unit 120 and the wide-band imaging unit 110 synchronously have performed imaging, and generated a synthesized image by synthesizing the synchronously captured images. In this way, when the narrow-band imaging unit 120 and the wide-band imaging unit 110 synchronously perform imaging, as illustrated in FIG. 11, a synthesized image can be generated even for a moving subject without causing positional deviation.

Figure 11:
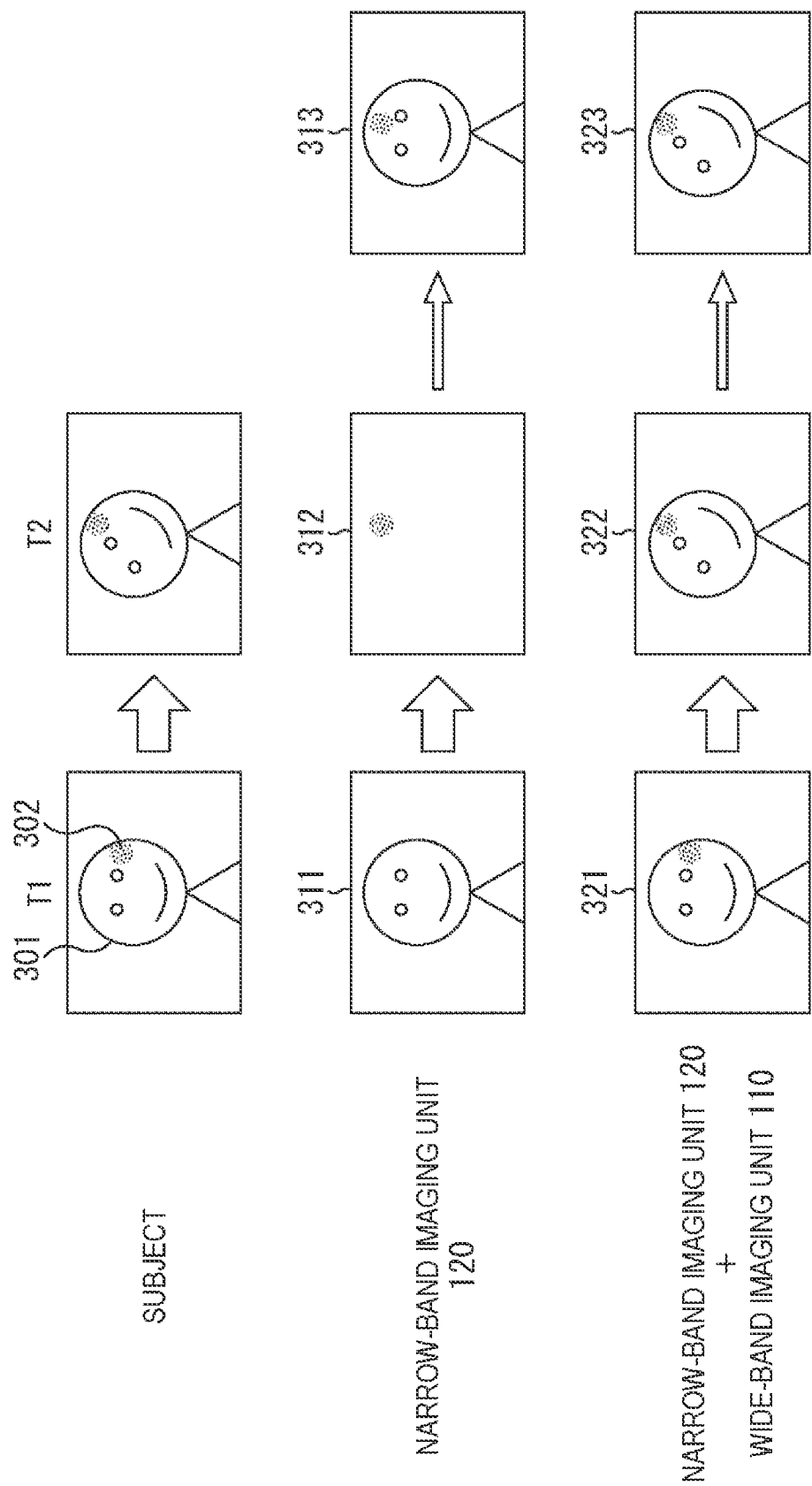
FIG. 11 is a view for explaining an effect on a moving subject.

A view in an upper part of FIG. 11 illustrates a subject at time T1 and the subject at time T2. In FIG. 11, as an example, a case will be described in which the subject is (a face of) a person and the subject having a pigmented spot 302 on a face 301 of the person is imaged. Furthermore, a case of imaging a subject in which the face 301 is directed to the front at the time T1 and the face 301 is tilted slightly at the time T2 will be described.

A view in a middle part of FIG. 11 illustrates an example of an image captured by the narrow-band imaging unit 120. At the time T1, the narrow-band imaging unit 120 performs imaging in a wavelength band in which the face 301 can be imaged, and acquires an image 311. It is assumed that the pigmented spot 302 is not imaged in this wavelength band. At the time T2, the narrow-band imaging unit 120 performs imaging in a wavelength band suitable for imaging the pigmented spot 302, and acquires an image 312. In the image 312, the pigmented spot 302 is imaged, and the face 301 is not imaged.

In a case where only the images obtained by the narrow-band imaging unit 120 are synthesized, that is, if the image 311 and the image 312 are synthesized, an image 313 is obtained. In the image 313, the face 301 and the pigmented spot 302 are imaged. When the image 313 is referred to, the pigmented spot 302 is located above an eye. An actual position of the pigmented spot 302 is located beside the eye when the view in the upper part in FIG. 11 is referred to.

From the time T1 to the time T2, since the face 301 has shifted to a state where the neck is tilted, the position of the pigmented spot 302 has also moved in the image. When the pigmented spot 302 imaged by the narrow-band imaging unit 120 at the time T2 is synthesized with the face 301 imaged by the narrow-band imaging unit 120 at the time T1, there is a possibility that a synthesized image in which the pigmented spot 302 is located above the eye as in the image 313 is generated.

In the present technology, since the narrow-band imaging unit 120 and the wide-band imaging unit 110 perform imaging in synchronization, an image as illustrated in a lower part of FIG. 11 is acquired.

At the time T1, the face 301 is imaged by the wide-band imaging unit 110. Furthermore, in a case where the narrow-band imaging unit 120 is set with a wavelength band suitable for imaging the pigmented spot 302, the face 301 and the pigmented spot 302 beside the eye are imaged as illustrated in an image 321. Therefore, as the synthesized image, an image in which the pigmented spot 302 is located at the correct position is acquired as illustrated in the image 321.

If the narrow-band imaging unit 120 is set with a wavelength band that is not suitable for imaging the pigmented spot 302, an image in which only the face 301 is imaged, for example, a color image but an image such as the image 311 is acquired as the synthesized image.

Furthermore, also at the time T2, similarly, the face 301 is imaged by the wide-band imaging unit 110, and the pigmented spot 302 is imaged by the narrow-band imaging unit 120. At the time T2, since the neck is in a state of being tilted, the position of the pigmented spot 302 is changed. However, the face 301 after the change is imaged by the wide-band imaging unit 110, and the pigmented spot 302 after the change is imaged by the narrow-band imaging unit 120.

Therefore, as illustrated in an image 3522, it is possible to obtain a synthesized image 323 in which the face 301 and the pigmented spot 302 beside the eye are imaged.

As described above, by performing imaging in synchronization of the narrow-band imaging unit 120 and the wide-band imaging unit 110, even if the subject moves, imaging with reduced influence of the movement can be performed.

Furthermore, the following cases can be handled. A plurality of images is acquired by sequentially changing the wavelength band of the narrow-band imaging unit 120 and performing imaging. A case of generating a synthesized image obtained by synthesizing the plurality of previous images will be considered.

The wide-band imaging unit 110 also captures a plurality of images in synchronization with imaging by the narrow-band imaging unit 120. The images captured by the wide-band imaging unit 110 are used for detecting a movement of the subject.

If the movement of the subject is not considered, as described with reference to the middle part of FIG. 11, synthesis is performed in a state where the movement is ignored even if the subject moves. Therefore, for example, there is a possibility that an image having the pigmented spot 302 at a wrong position is generated.

By detecting the movement of the subject by using the image captured by the wide-band imaging unit 110 and generating the synthesized image in consideration of the movement, it is possible to prevent generation of a synthesized image in which the pigmented spot 302 is at a wrong position. That is, by detecting the movement of the subject by using the image captured by the wide-band imaging unit 110, correcting the position of the pigmented spot 302 in the image according to the movement, for example, and performing synthesizing, it is possible to prevent generation of a synthesized image in which the pigmented spot 302 is at a wrong position even in a case where the subject moves.

For example, when synthesizing the image 311 captured at the time T1 and the image 312 captured at the time T2 by the narrow-band imaging unit 120, an image 312' is generated by moving the position of the pigmented spot 302 in the image 312 to a position corrected by an amount of the tilt of the subject. Then, by synthesizing the image 312' and the image 311, for example, it is possible to generate a synthesized image in which the pigmented spot 302 is located beside the eye of the face 301 as in the image 321.

In this way, the movement of the subject can be detected using the image captured by the wide-band imaging unit 110, and the image captured by the narrow-band imaging unit 120 can be corrected using the detection result. In other words, an output result between frames captured by the narrow-band imaging unit 120 can be corrected using an output result from the wide-band imaging unit 110. That is, according to the present technology, moving subject correction can be performed on a result of the narrow-band imaging unit 120 by using an output obtained from the wide-band imaging unit 110.

<About Correction>

In the above-described embodiment, as an example, a case of a configuration has been described in which the narrow-band photoelectric conversion unit 1522 of the narrow-band imaging unit 120 includes the Fabry-Perot spectrometer 251, and the Fabry-Perot spectrometer 251 can vary a wavelength band of light to be transmitted.

As described with reference to FIG. 5, the Fabry-Perot spectrometer 251 has a configuration in which two semitransparent mirrors 252 and 253 are arranged in parallel at a predetermined interval. The interval between the semitransparent mirror 252 and the semitransparent mirror 253 is preferably uniform. However, in general, the interval between the semitransparent mirror 252 and the semitransparent mirror 253 tends to be non-uniform.

When the interval is non-uniform, a wavelength band of light to be transmitted through the Fabry-Perot spectrometer 251 may be non-uniform. According to the present technology, the non-uniformity of the Fabry-Perot spectrometer 251 can be corrected using an image captured by the wide-band imaging unit 110, to be treated as being uniform.

A description will be made with reference to FIG. 12. For example, the wide-band imaging unit 110 and the narrow-band imaging unit 120 image a monochromatic wall surface 401. An image captured by the wide-band imaging unit 110 is defined as an image 411. Furthermore, an image captured by the narrow-band imaging unit 120 is defined as an image 412.

By capturing the monochromatic wall surface 401, the image 411 obtained from the wide-band imaging unit 110 is to be basically an image having the same color as the monochromatic wall surface 401. Whereas, in a case where the Fabry-Perot spectrometer 251 is non-uniform, the image 412 obtained from the narrow-band imaging unit 120 is an image having color unevenness as illustrated as the image 412 in FIG. 12, for example.

While the image 411 is regarded as a correct image, the image 412 is corrected such that the image 412 becomes the same image as the image 411. For example, shading detection is performed for each wavelength, and the image acquired by the narrow-band imaging unit 120 is corrected on the basis of the result.

Figure 13:
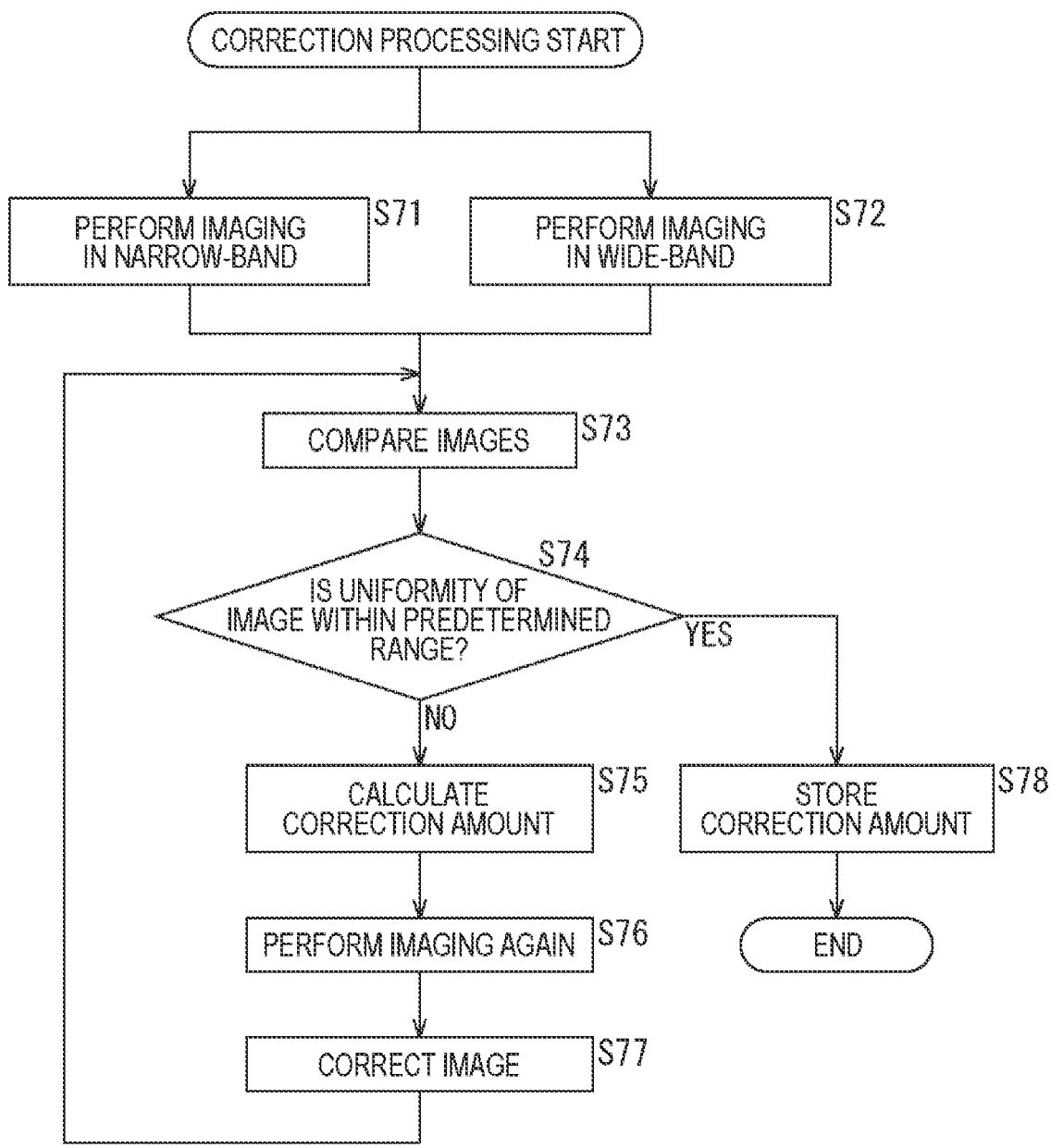
FIG. 13 is a flowchart for explaining correction.

Correction of an image captured by the narrow-band imaging unit 120 will be described with reference to a flowchart of FIG. 13.

In step S71, the narrow-band imaging unit 120 performs imaging by setting a wavelength band of light to be transmitted by the Fabry-Perot spectrometer 251 to a predetermined wavelength band. In synchronization with the imaging of the narrow-band imaging unit 120, the wide-band imaging unit 110 also performs imaging (step S72).

Figure 12:
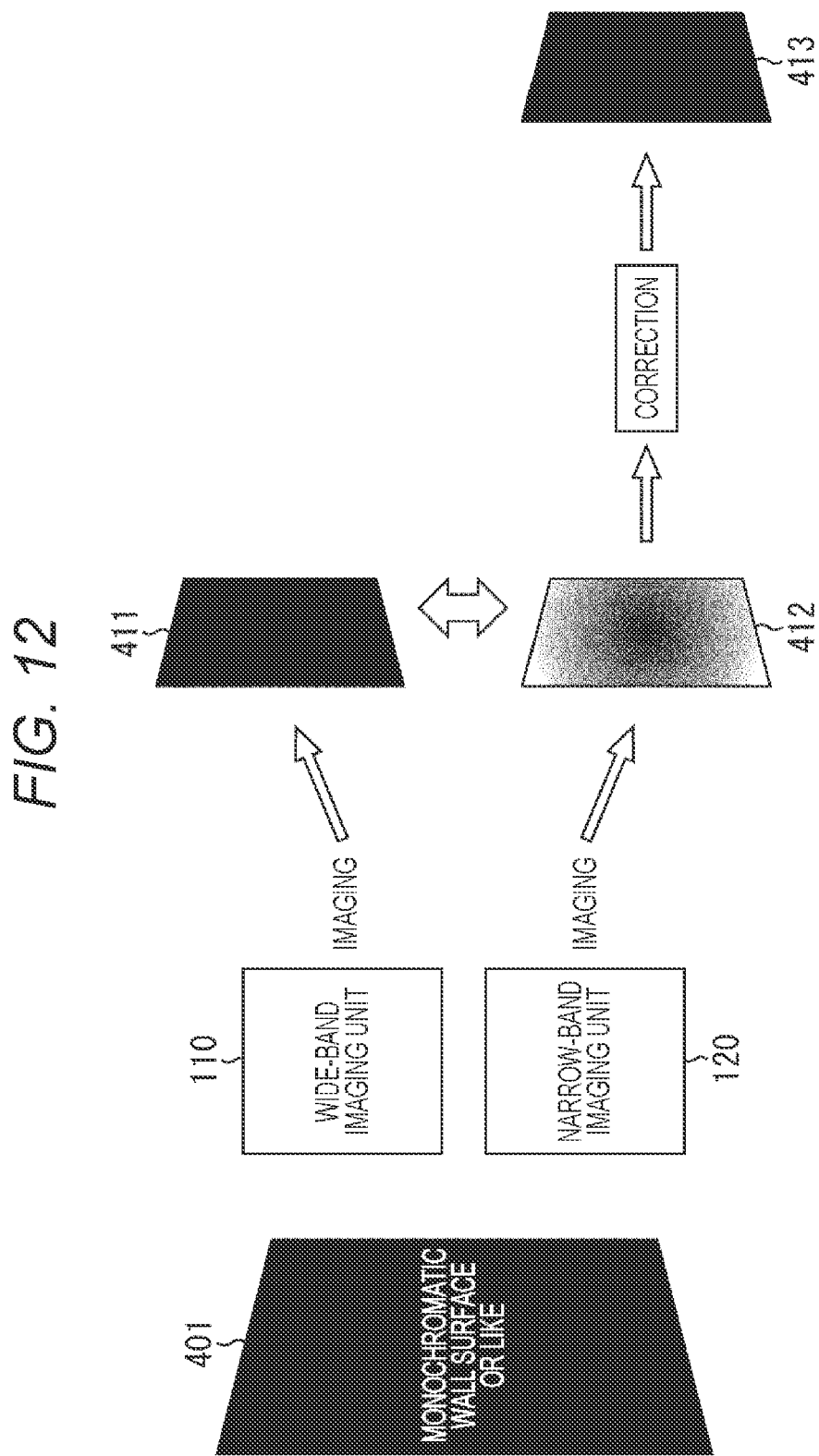
FIG. 12 is a view for explaining correction.

In step S73, the processing unit 131 compares an image captured by the narrow-band imaging unit 120 (the image corresponding to the image 412 in FIG. 12) with an image captured by the wide-band imaging unit 110 (an image corresponding to the image 411 in FIG. 12). Color uniformity in the image captured by the narrow-band imaging unit 120 is compared with color uniformity in the image captured by the wide-band imaging unit 110.

In step S74, a comparison result in step S73 is used to determine whether or not the color uniformity in the images is different. In a case where it is determined in step S74 that the color uniformity in the images is different, the process proceeds to step S75.

In step S75, a correction amount is calculated. The correction amount is calculated by shifting a color of the image 411 captured by the narrow-band imaging unit 120 so as to match the color uniformity of the image 412 captured by the wide-band imaging unit 110.

After the correction amount is calculated, the process proceeds to step S76. In step S76, imaging is performed again. For imaging, the narrow-band imaging unit 120 and the wide-band imaging unit 110 may be synchronized with each other, and imaging may be performed by each imaging unit. Furthermore, the image obtained in the process of step S72 may be used without imaging with the wide-band imaging unit 110.

Furthermore, the narrow-band imaging unit 120 performs imaging in a wavelength band different from the wavelength band set at the time of the process in step S71. The image obtained by performing imaging with the narrow-band imaging unit 120 in step S76 is corrected in step S77. This correction is correction using the correction amount calculated in step S75.

When a corrected image is generated in step S77, the process returns to step S73, and the subsequent processes are repeated. In step S73, the corrected image is compared with the image 411 captured by the wide-band imaging unit 110.

In this way, a correction parameter is set by capturing a plurality of images while changing the wavelength band of the narrow-band imaging unit 120 and comparing with the image from the wide-band imaging unit 110.

In step S74, in a case where it is determined that the image as a result of the correction has equivalent uniformity to the image from the wide-band imaging unit 110 (the uniformity falls within the predetermined range), the process proceeds to step S78. In step S78, the set correction parameter is stored, for example, in the memory 134 (FIG. 2).

Thereafter, the image captured by the narrow-band imaging unit 120 is corrected using the correction parameter stored in the memory 134, and the corrected image is used in each process described above.

As described above, since the imaging device 100 includes the wide-band imaging unit 110 and the narrow-band imaging unit 120, an image captured by the narrow-band imaging unit 120 can be corrected using an image captured by the wide-band imaging unit 110. Therefore, even if the Fabry-Perot spectrometer 251 is non-uniform, it can be corrected and handled as if being uniform.

According to the present technology, it is possible to acquire an image in which in-plane uniformity is improved in an image captured by the narrow-band imaging unit 120 using the Fabry-Perot spectrometer 251.

<About Another Configuration of Wide-Band Photoelectric Conversion Unit>

A case of a configuration in which the wide-band photoelectric conversion unit 112 described above includes the RGB color filter has been described as an example. A configuration may be adopted in which the wide-band photoelectric conversion unit 112 includes a filter other than the color filter. For example, as illustrated in FIG. 14, a configuration may be adopted in which pixels configured to individually receive three colors with one pixel are arranged in a two-dimensional array.

Figure 14:
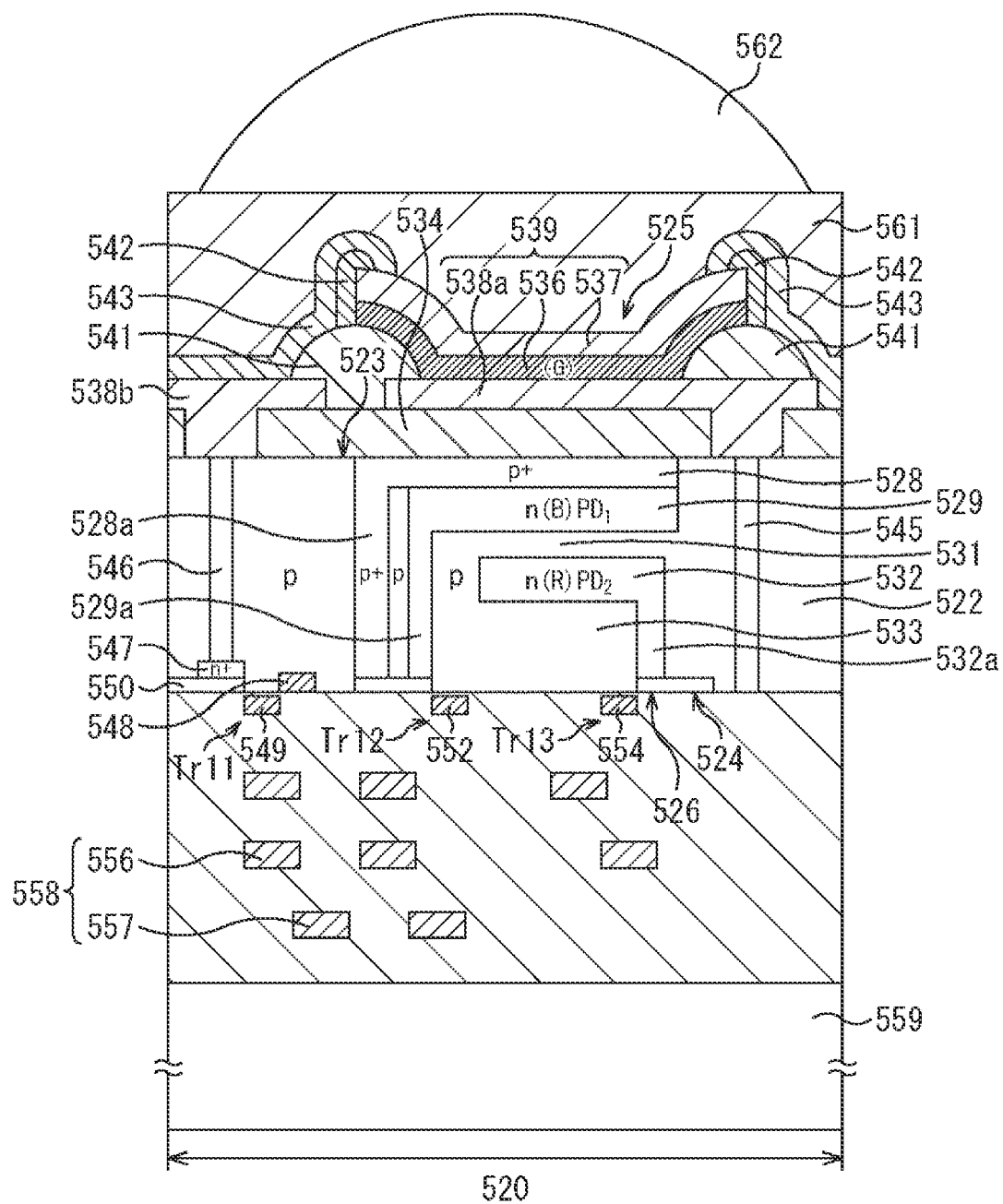
FIG. 14 is a view illustrating a configuration example of a pixel.

FIG. 14 illustrates a cross-sectional configuration example of a pixel unit of the wide-band photoelectric conversion unit 112. A pixel 520 arranged in the pixel array unit of the wide-band photoelectric conversion unit 112 includes one organic photoelectric conversion unit 539 and inorganic photoelectric conversion units PD1 and PD2 having two pn junctions, which are stacked in a depth direction in the same pixel, that is, one pixel. More specifically, the pixel 520 of the wide-band photoelectric conversion unit 112 includes a semiconductor substrate (a silicon substrate) 522 in which an inorganic photoelectric conversion unit to be described later is formed. A light-receiving surface on which light is incident is formed on a back surface 523 side of the substrate 522, and a circuit including a so-called read circuit or the like is formed on a front surface 524 side of the substrate 522. That is, the pixel 520 has a light-receiving surface 525 on the back surface 523 side of the substrate 522 and a circuit formation surface 526 formed on the substrate front surface 524 side, which is an opposite side to the light-receiving surface 525. The semiconductor substrate 522 is configured by a semiconductor substrate of a first conductivity type, for example, an n-type.

In the semiconductor substrate 522, inorganic photoelectric conversion units having two pn junctions, that is, a first photodiode PD1 and a second photodiode PD2 are formed so as to be stacked in a depth direction from the back surface 523 side. In the semiconductor substrate 522, a p-type semiconductor region 528 serving as a hole accumulation layer, an n semiconductor region 529 serving as a charge accumulation layer, a p-type semiconductor region 31, an n-type semiconductor region 532 serving as a charge accumulation layer, and a p-type semiconductor region 533 are formed in the depth direction from the back surface 523 side. The first photodiode PD1 with the n-type semiconductor region 529 as a charge accumulation layer is formed, and the second photodiode PD2 with the n-type semiconductor region 532 as a charge accumulation layer is formed.

In this example, the first photodiode PD1 is for blue color, and the second photodiode PD2 is for red color. Each of the n-type semiconductor regions 529 and 532 is formed to extend such that a part thereof reaches the front surface 524 of the substrate 522. Respective extension parts 529a and 532a extend from end portions of the respective n-type semiconductor regions 529 and 532 on opposite sides to each other. Furthermore, the p-type semiconductor region 528 serving as the hole accumulation layer is connected to a p-type semiconductor well region on the front surface side. Furthermore, a p-type semiconductor region serving as a hole accumulation layer is formed at least at an interface between with an insulating film facing the substrate front surface 524, in each of the n-type semiconductor region 529 of the first photodiode PD1 and the n-type semiconductor region 532 of the second photodiode PD2.

Whereas, on an upper layer of the substrate back surface in a region where the first and second photodiodes PD1 and PD2 are formed, via an insulating film 534, the organic photoelectric conversion unit 539 for a first color is stacked, which is configured such that upper and lower surfaces of an organic photoelectric conversion unit 536 are sandwiched between an upper electrode 537 and a lower electrode 538a. In this example, the organic photoelectric conversion unit 536 is for green color. The upper electrode 537 and the lower electrode 538a are formed by, for example, a transparent conductive film such as an indium tin oxide (ITO) film or an indium zinc oxide film.

In the above example, it has been assumed that the organic photoelectric conversion unit 539 is for green color, the first photodiode PD1 is for blue color, and the second photodiode PD2 is for red color as a combination of colors, but other color combinations are also possible. For example, the organic photoelectric conversion unit 539 can be set for red or blue, and the first photodiode PD1 and the second photodiode PD2 can be set for other corresponding colors. In this case, positions in the depth direction of the first and second photodiodes PD1 and PD2 are set in accordance with the colors.

As an organic photoelectric conversion film that performs photoelectric conversion with green wavelength light, for example, an organic photoelectric conversion material containing rhodamine dye, merocyanine dye, quinacridone, or the like can be used. As an organic photoelectric conversion film that performs photoelectric conversion with red wavelength light, an organic photoelectric conversion material containing phthalocyanine dye can be used. As an organic photoelectric conversion film that performs photoelectric conversion with blue wavelength light, an organic photoelectric conversion material containing a coumarin dye, tris-8 hydroxyquinoline Al (Alq3), merocyanine dye, or the like can be used.

In the organic photoelectric conversion unit 539, transparent lower electrodes 538a and 538b divided into two are formed on the insulating film 534, and an insulating film 541 for insulation and separation of both the lower electrodes 538a and 538b from each other is formed. Then, the organic photoelectric conversion unit 536 and the transparent upper electrode 537 thereon are formed on the one lower electrode 538a. An insulating film 542 is formed that protects patterned end surfaces of the upper electrode 537 and the organic photoelectric conversion unit 536, and an end surface patterned by etching. In this state, the upper electrode 537 is connected to another lower electrode 538b via a contact metal layer 543 formed by another conductive film.

By forming the insulating film for protection, the end surface of the organic photoelectric conversion film is protected, and contact between the organic photoelectric conversion film and the electrode can be prevented. An electrode material is selected for the upper electrode 537 in consideration of a work function. Therefore, when a different electrode material comes into contact with the end surface, that is, a side wall of the organic photoelectric conversion film, dark current may be generated on the side wall of the organic photoelectric conversion film. Furthermore, since the organic photoelectric conversion unit 536 and the upper electrode 537 are formed consistently, a clean interface is formed. However, the side wall of the organic photoelectric conversion unit 536 after being patterned by dry etching or the like is not a clean surface, and contacting with a different electrode material may deteriorate an interface and leads to an increase in dark current.

In the semiconductor substrate 522 in one pixel 520, a pair of conductive plugs 545 and 546 penetrating the semiconductor substrate 522 are formed. The lower electrode 538a of the organic photoelectric conversion unit 539 is connected to one conductive plug 545, and the lower electrode 538b connected to the upper electrode 537 is connected to another conductive plug 546. Since it suffices that one conductive plug 545 is present for the lower electrode, at least one conductive plug is only required to be present in the entire pixel region unless the upper electrode is separated for every pixel.

For example, the conductive plugs 545 and 546 can be formed by a W plug having a SiO2 or SiN insulating layer in a periphery in order to suppress a short circuit with Si, a semiconductor layer by ion implantation, or the like. In this example, since a signal charge is electrons, the conductive plug 545 is to be an n-type semiconductor layer in a case of forming with a semiconductor layer by ion implantation. The upper electrode is preferably p-type because holes are extracted.

In this example, an n-type region 547 for charge accumulation is formed on the front surface side of the substrate 522 in order to accumulate electrons to be signal charges among the electron-hole pairs photoelectrically converted by the organic photoelectric conversion unit 536, through the upper electrode 537 and the conductive plug.

As the insulating film 534 on the back surface 523 of the semiconductor substrate 522, a film having a negative fixed charge is preferably used. As the film having a negative fixed charge, for example, a hafnium oxide film can be used. That is, the insulating film 534 is formed in a three-layer structure obtained by forming a silicon oxide film, a hafnium oxide film, and a silicon oxide film from the back surface 523. Since the hafnium oxide film has a negative fixed charge, a hole accumulation state at an interface between silicon of the p-type semiconductor region (silicon) 528 and the insulating film 534 is strengthened, which is advantageous in suppressing generation of dark current.

On the circuit formation surface 526 on the front surface side of the substrate 522, a plurality of pixel transistors individually corresponding to the organic photoelectric conversion unit 536, the first photodiode PD1, and the second photodiode PD2 is formed. As the plurality of pixel transistors, a four-transistor configuration or a three-transistor configuration can be applied. Furthermore, a configuration in which the above-described pixel transistors are shared can also be applied. In the organic photoelectric conversion unit 536, the n-type semiconductor region 547 for charge accumulation is connected to an n-type semiconductor region 548 serving as a floating diffusion unit and to a transfer transistor Tr511 having a transfer gate electrode 549. In the first photodiode PD1, the extension part 529a of the n-type semiconductor region 529 serving as a charge accumulation layer is connected to an n-type semiconductor region 551 serving as a floating diffusion part and to a transfer transistor Tr512 having a transfer gate electrode 552. In the second photodiode PD2, the extension part 532a of the n-type semiconductor region 532 serving as a charge accumulation layer is connected to an n-type semiconductor region 553 serving as the floating diffusion part and to a transfer transistor Tr513 having a transfer gate electrode 554.

Then, a p-type semiconductor region 550 serving as a hole accumulation layer is formed at least at an interface with an insulating film facing the substrate front surface 524, in the n-type semiconductor regions 529a to 532a constituting the first and second photodiode diodes PD1 and PD2. The p-type semiconductor region 550 serving as a hole accumulation layer is formed including an interface between the p-type semiconductor region 533 and the insulating film. Furthermore, the p-type semiconductor region 550 serving as a hole accumulation layer is formed at an interface with an insulating film facing the substrate front surface 524, in the n-type semiconductor region 547 for charge accumulation in the organic photoelectric conversion unit 536. The pixel transistor including the transfer transistors Tr511 to Tr513 described above is formed in the p-type semiconductor well region on the substrate front surface side.

Note that, although not illustrated, a pixel transistor of a pixel unit is formed on the front surface side of the semiconductor substrate 522, and a peripheral circuit such as a logic circuit is formed in a peripheral circuit unit.

On the front surface of the semiconductor substrate 522, a multilayer wiring layer 558 in which a plurality of layers of wiring 557 is disposed is formed via an interlayer insulating film 556. To the multilayer wiring layer 558, a support substrate 59 is bonded.

The back surface side of the semiconductor substrate 522, more specifically, a surface of the upper electrode 537 of the organic photoelectric conversion unit 539 serves as the light-receiving surface 525. Then, an on-chip lens 562 is formed on the organic photoelectric conversion unit 539 via a planarization film 561. In this example, no color filter is formed.

Such a pixel 520 on which no color filter is formed can also be used as a pixel of the wide-band imaging unit 110.

Furthermore, instead of a color file, a filter having color arrangement illustrated in FIG. 15 may be used for the wide-band imaging unit 110. Furthermore, as the filter, a filter called a plasmon filter that performs optical control using plasmon resonance can be used. FIG. 15 is a view illustrating a configuration example in which G pixels are added to multispectral pixels. In FIG. 15, reference of "G" represents a G pixel, and reference of "MS" represents an MS pixel. The G pixel is a pixel in which a color of a color filter layer is green. The MS pixel is a multispectral pixel, and is a pixel that receives light (a predetermined color) in a predetermined frequency band.

FIG. 15 illustrates 16 pixels of 4×4 in the pixel region 203, and a pixel group of such an array is repeatedly arrayed in the pixel region 203. In order to distinguish the 16 pixels illustrated in FIG. 15, numbers are individually added. For example, among the 16 pixels, a pixel arranged at the upper left is a G1 pixel, and a pixel arranged on a right side of the G1 pixel is an MS1 pixel.

In the color arrangement illustrated in FIG. 15, an example is illustrated in which the G pixels and the MS pixels of the same numbers are arranged. That is, among the 16 pixels, G1 to G8 are the G pixels, and MS1 to MS8 are the MS pixels. Furthermore, the G pixels and the MS pixels are alternately arranged in each of a horizontal direction and a vertical direction.

Note that, here, the description will be continued by taking an example in which the G pixels and the MS pixels are alternately arranged, but the arrangement may be different. For example, the color arrangement may be such that two G pixels and two MS pixels are alternately arranged, or one G pixel and two MS pixels are alternately arranged.

The G pixel is a pixel that receives light to be green, for example, light in a frequency band of 500 to 550 nm. In FIG. 15, each of the G1 to G8 pixels is a pixel that receives light in this frequency band.

The MS pixel is a pixel that receives light in a frequency band to be extracted. In FIG. 15, the MS1 to MS8 pixels individually receive light in different frequency bands. That is, in this case, the MS1 to MS8 pixels are sensors capable of handling light in eight frequency bands.

Note that, here, the description will be continued assuming that all the MS1 to MS8 pixels receive light in different frequency bands, but may be pixels that receive light in the same frequency band. In a case of handling, for example, four frequency bands depending on the number of frequency bands to be handled, a configuration may also be adopted in which, for example, the MS1 pixel and the MS2 pixel are pixels that receive light in a first frequency band, the MS3 pixel and the MS4 pixel are pixels that receive light in a second frequency band, the MS5 pixel and the MS6 pixel are pixels that receive light in a third frequency band, and the MS7 pixel and the MS8 pixel are pixels that receive light in a fourth frequency band.

Figure 16:
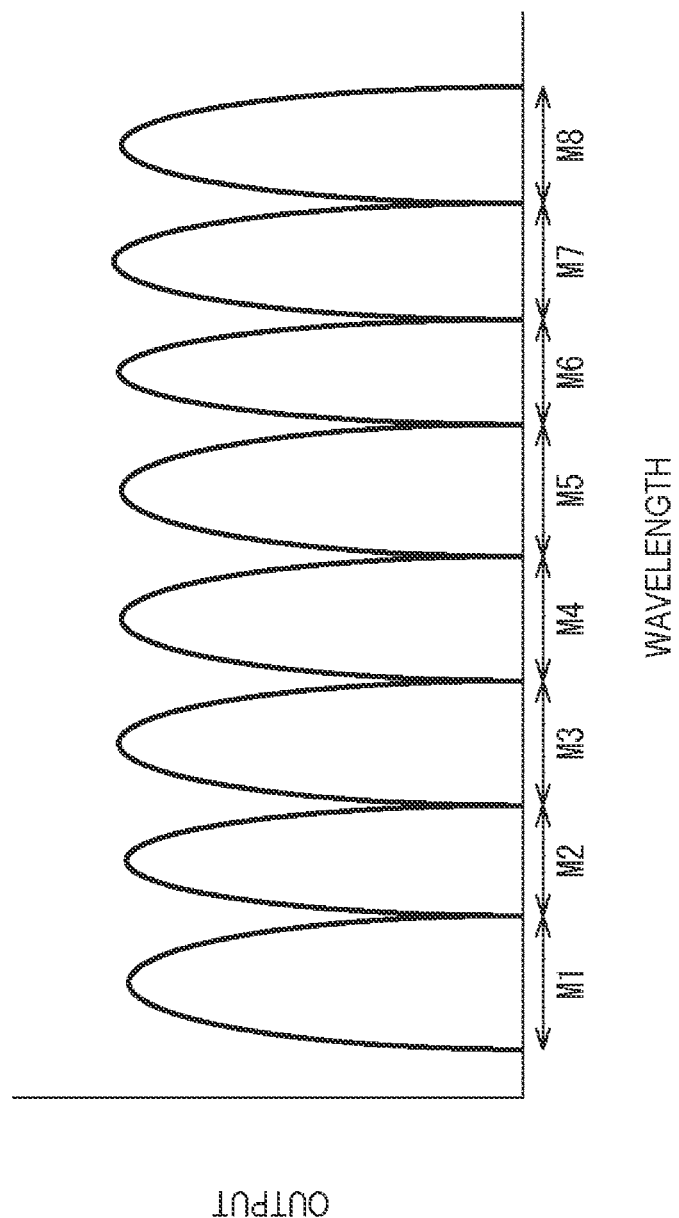
FIG. 16 is a view for explaining an output from a multispectral pixel.

In a case where the MS1 to MS8 pixels are configured on the assumption that all the MS1 to MS8 pixels receive light in different frequency bands, for example, signals as illustrated in FIG. 16 are obtained from the MS1 to MS8 pixels.

The MS1 pixel receives light in a frequency band M1. Similarly, the MS2 pixel receives light in a frequency band M2, the MS3 pixel receives light in a frequency band M3, the MS4 pixel receives light in a frequency band M4, the MS5 pixel receives light in a frequency band M5, the MS6 pixel receives light in a frequency band M6, the MS7 pixel receives light in a frequency band M7, and the MS8 pixel receives light in a frequency band M8.

In this way, the MS1 to MS8 pixels can be pixels that receive light in the different frequency bands M1 to M8, respectively. Furthermore, from the G1 to G8 pixels, a pixel can be made to individually receive light in the green frequency band G.

Therefore, in a case of such a configuration 1, with 16 pixels illustrated in FIG. 15, information on green is acquired from the G pixel, information on a color M1 in the frequency band M1 is acquired from the MS1 pixel, information on a color M2 in the frequency band M2 is acquired from the MS2 pixel, information on a color M3 in the frequency band M3 is acquired from the MS3 pixel, information on a color M4 in the frequency band M4 is acquired from the MS4 pixel, information on a color M5 in the frequency band M5 is acquired from the MS5 pixel, information on a color M6 in the frequency band M6 is acquired from the MS6 pixel, information on a color M7 in the frequency band M7 is acquired from the MS7 pixel, and information on a color M8 in the frequency band M8 is acquired from the MS8 pixel.

The present technology can also be applied to a case where a multispectral sensor is configured using the plasmon filter described with reference to FIGS. 15 and 16 as the filter of the wide-band photoelectric conversion unit 112, and a multispectral image is captured.

Note that the multispectral sensor may be realized by using a filter other than the plasmon filter, for example, can be realized by making the color filter in multicolor. Furthermore, in addition to the visible light region, pixels that handle light of an ultraviolet region, an infrared region, or the like may be included.

Example of Application to AR, VR, and the Like

The imaging device 100 to which the present technology is applied can be applied to devices that provide augmented reality (AR), virtual reality (VR), mixed reality (MR), and the like. Here, a case where the imaging device 100 is applied to a device that provides AR will be described as an example.

Figure 17:
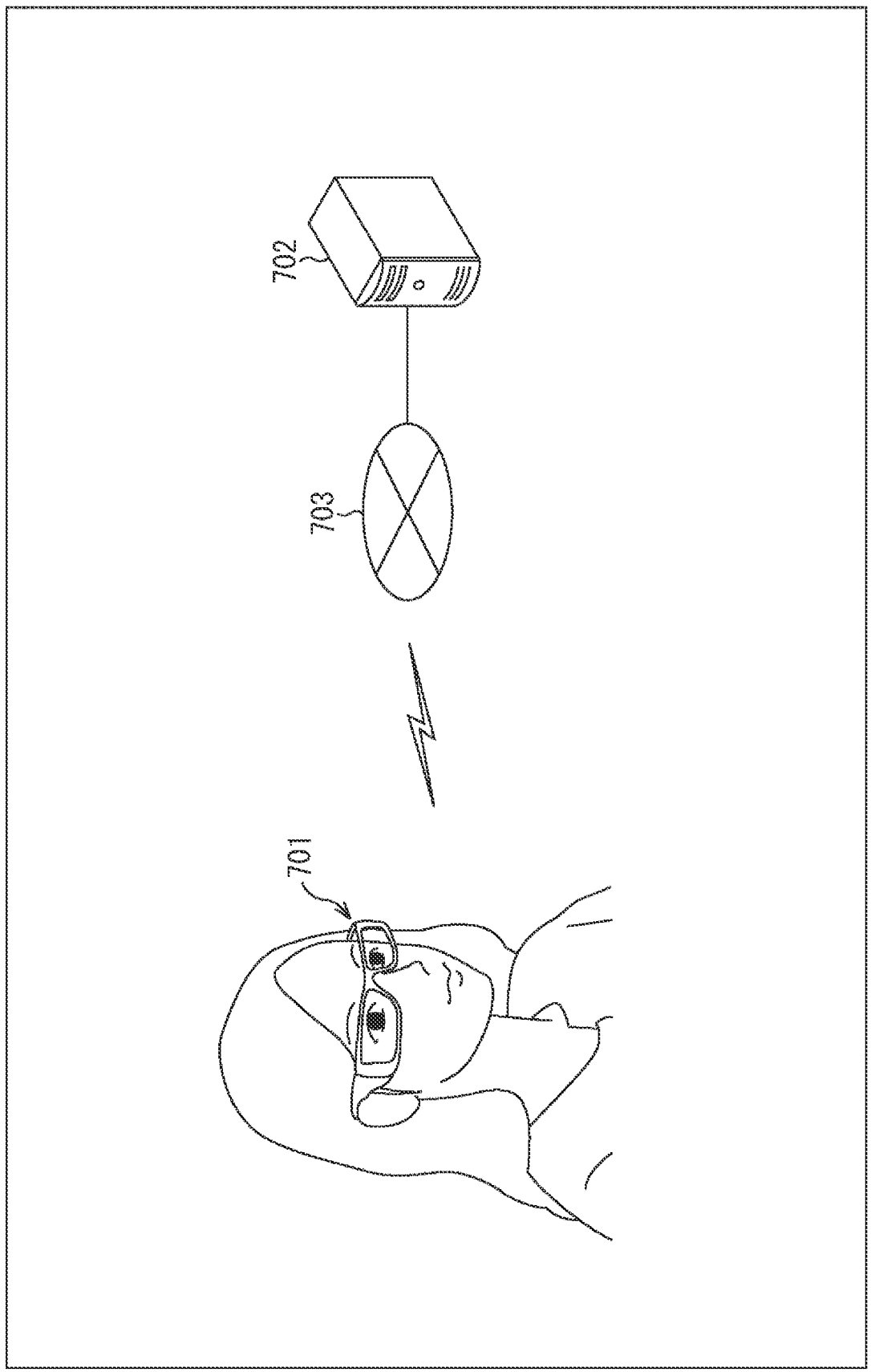
FIG. 17 is a view illustrating a configuration of an embodiment of an information processing system.

FIG. 17 is a view illustrating a configuration example of an information processing system including an AR-HMD 701 that provides AR. The information processing system in FIG. 17 is configured by connecting the AR-HMD 701 and an information processing apparatus 702 via a network 703 such as a local area network (LAN) or the Internet.

As illustrated in FIG. 17, the AR-HMD 701 is a spectacle-shaped wearable terminal including a transmissive display unit. The AR-HMD 701 displays a video image including various objects such as a character, on a display unit under control of the information processing apparatus 702 performed via the network 703. A user will see an object superimposed on a landscape in front of the self.

A projection method of the video image including the objects may be a virtual image projection method, or may be a retinal projection method in which an image is directly formed on the retina of the user's eye.

The information processing apparatus 702 reproduces an AR content and transmits video data obtained by the reproduction to the AR-HMD 701, so that the video image of the AR content is displayed on the AR-HMD 701. The information processing apparatus 702 is configured by, for example, a personal computer (PC). Furthermore, the information processing apparatus 702 may be the server 151 (FIG. 2), and for example, may be configured to supply information regarding estimation of a subject and information about a wavelength band suitable for the subject, to the AR-HMD 701.

Figure 18:
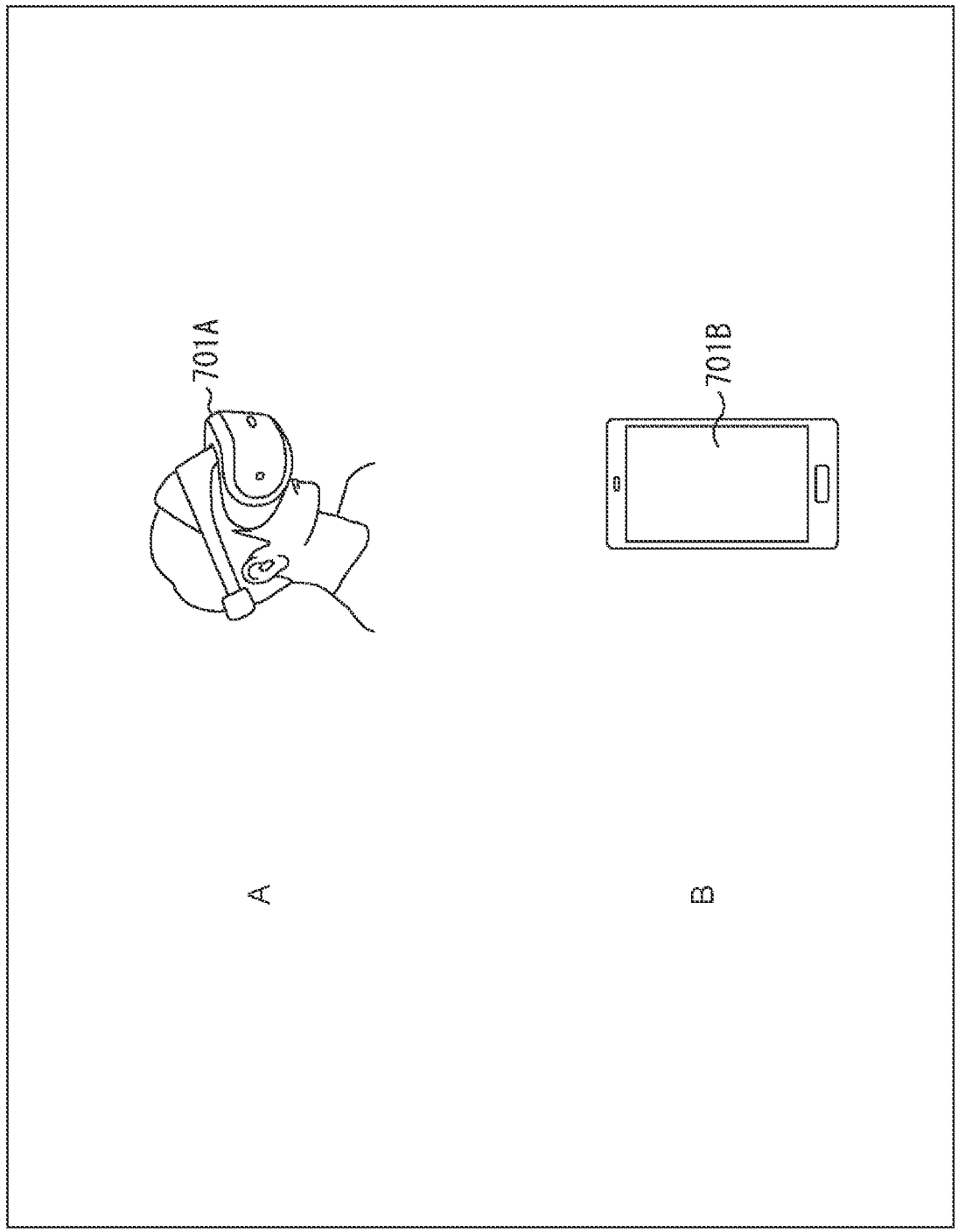
FIG. 18 is a view illustrating an example of a display device.

Instead of the AR-HMD 701, a mobile terminal such as an AR-HMD 701A, which is a video transmissive HMD illustrated in A of FIG. 18, or a smartphone 701B illustrated in B of FIG. 18 may be used as a display device for an AR content.

In a case of using the AR-HMD 701A as the display device, a video image of an AR content reproduced by the information processing apparatus 702 is displayed to be superimposed on an image of a landscape in front of the AR-HMD 701A captured by a camera installed in the AR-HMD 701A. In front of the eyes of the user wearing the AR-HMD 701A, there is a display that displays an AR content superimposed on an image captured by the camera.

Furthermore, in a case of using the smartphone 701B, a video image of an AR content reproduced by the information processing apparatus 702 is displayed to be superimposed on an image of a landscape in front of the smartphone 701B captured by a camera installed on a back surface of the smartphone 701B. On the front of the smartphone 701B, a display that displays various images is provided.

The imaging device 100 described above can be applied to cameras included in the AR-HMD 701, the AR-HMD 701A, and the smartphone 701B.

As the display device for an AR content, a projector that projects a video image on a front surface of an object existing in an actual scene may be used. Various devices such as tablet terminals and television receivers can be used as the display device for the AR content.

The display device and the information processing apparatus 702 may be connected by a wire instead of being wirelessly connected via the network 703.

Figure 19:
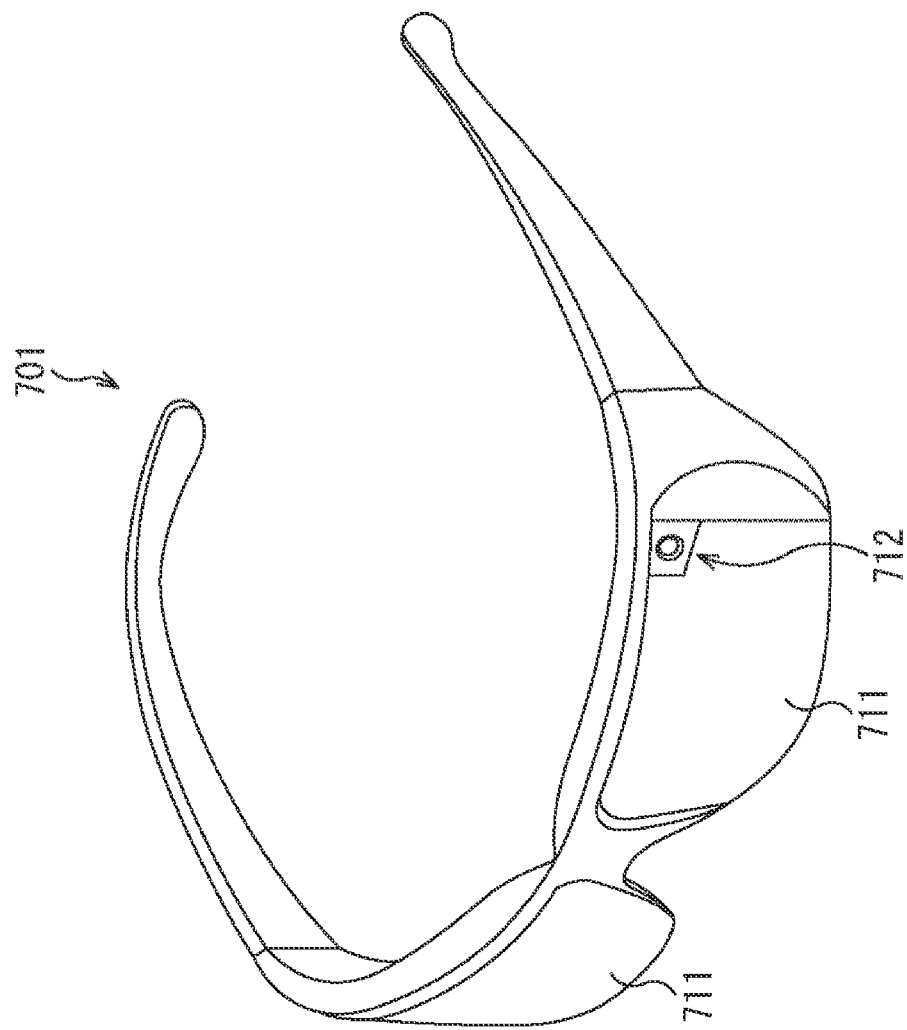
FIG. 19 is a view illustrating an external configuration of an AR-HMD.

In the following description, as illustrated in FIG. 19, a wearable terminal having a form of a spectacle shape will be described as an example of an information processing apparatus to which the present technology is applied.

The AR-HMD 701 illustrated in FIG. 19 has a spectacle shape as a whole, and includes a display unit 711 and a 7 camera 12. The display unit 711 corresponds to a lens portion of spectacles, and is entirely configured as a transmissive display, for example. Therefore, the display unit 711 transmissively superimposes and displays an annotation (a virtual object) on an image (a real object) in the real world that the user is directly viewing.

The camera 712 is provided at an end of the display unit 711 corresponding to the left eye of the user wearing the AR-HMD 701, and captures an image of a real space included in a visual field of the user. The imaging device 100 (FIG. 2) can be applied to the camera 712.

An image acquired by the camera 712 can be displayed on the display unit 711, and the annotation can also be superimposed and displayed on the image. Furthermore, although not illustrated, a housing corresponding to a frame of the spectacles in the AR-HMD 701 may accommodate or be mounted with various sensors, a button, a speaker, and the like.

Note that the shape of the AR-HMD 701 is not limited to the shape illustrated in FIG. 19, and may take various shapes such as a hat shape, a belt shape that is fixed around the user's head, and a helmet shape that covers the entire user's head. That is, the technology according to the present disclosure can be applied to an HMD in general.

Figure 20:
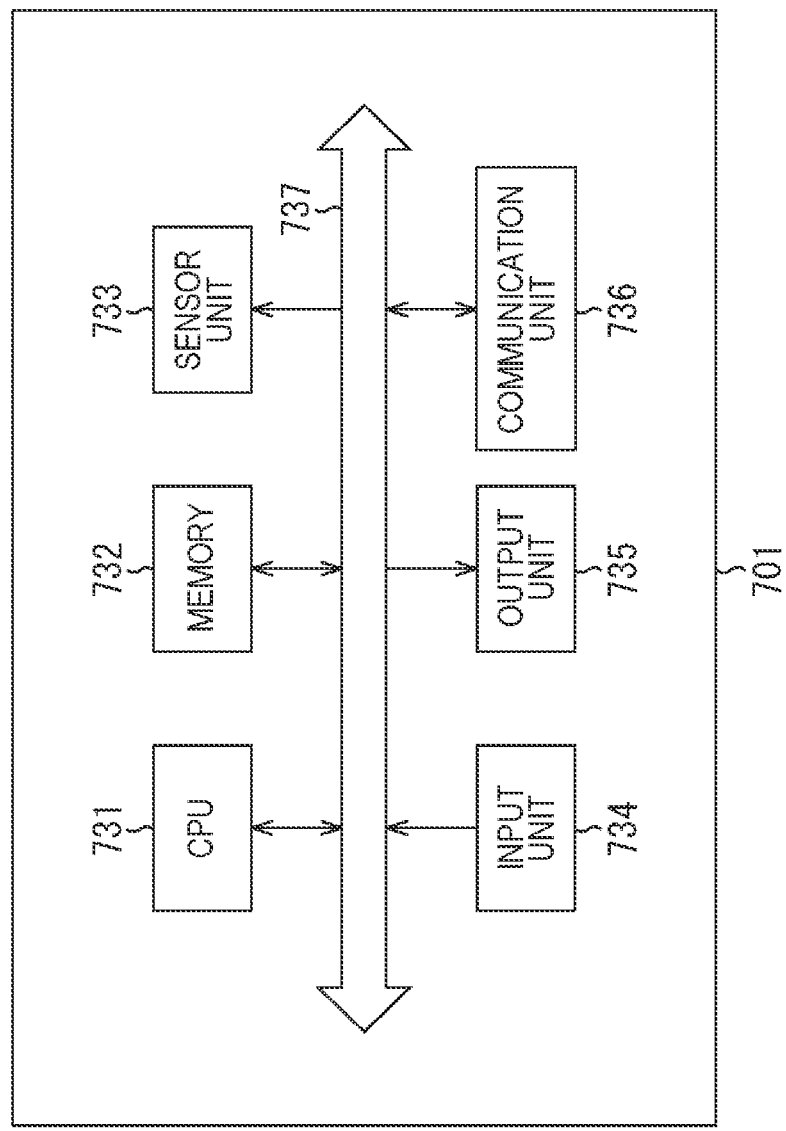
FIG. 20 is a block diagram illustrating a configuration example of an AR-HMD as an information processing apparatus.

FIG. 20 is a block diagram illustrating a configuration example of the AR-HMD 701. The AR-HMD 701 in FIG. 20 includes a central processor unit (CPU) 731, a memory 732, a sensor unit 733, an input unit 734, an output unit 735, and a communication unit 736. These are connected to each other via a bus 737.

The CPU 731 executes processing for implementing various functions of the AR-HMD 701 in accordance with a program and data stored in the memory 732. The memory 732 is configured by a storage medium such as a semiconductor memory or a hard disk, and stores a program and data for processing by the CPU 731.

The sensor unit 733 includes various sensors such as a microphone, a gyro sensor, and an acceleration sensor in addition to the camera 712 in FIG. 19. For various pieces of sensor information acquired by the sensor unit 733 as well, the input unit 734 to be used for processing by the CPU 731 is configured by a button, a key, a touch panel, and the like. The output unit 735 is configured by the display unit 711 in FIG. 19, a speaker, and the like. The communication unit 736 is configured as a communication interface that mediates various types of communication.

Figure 21:
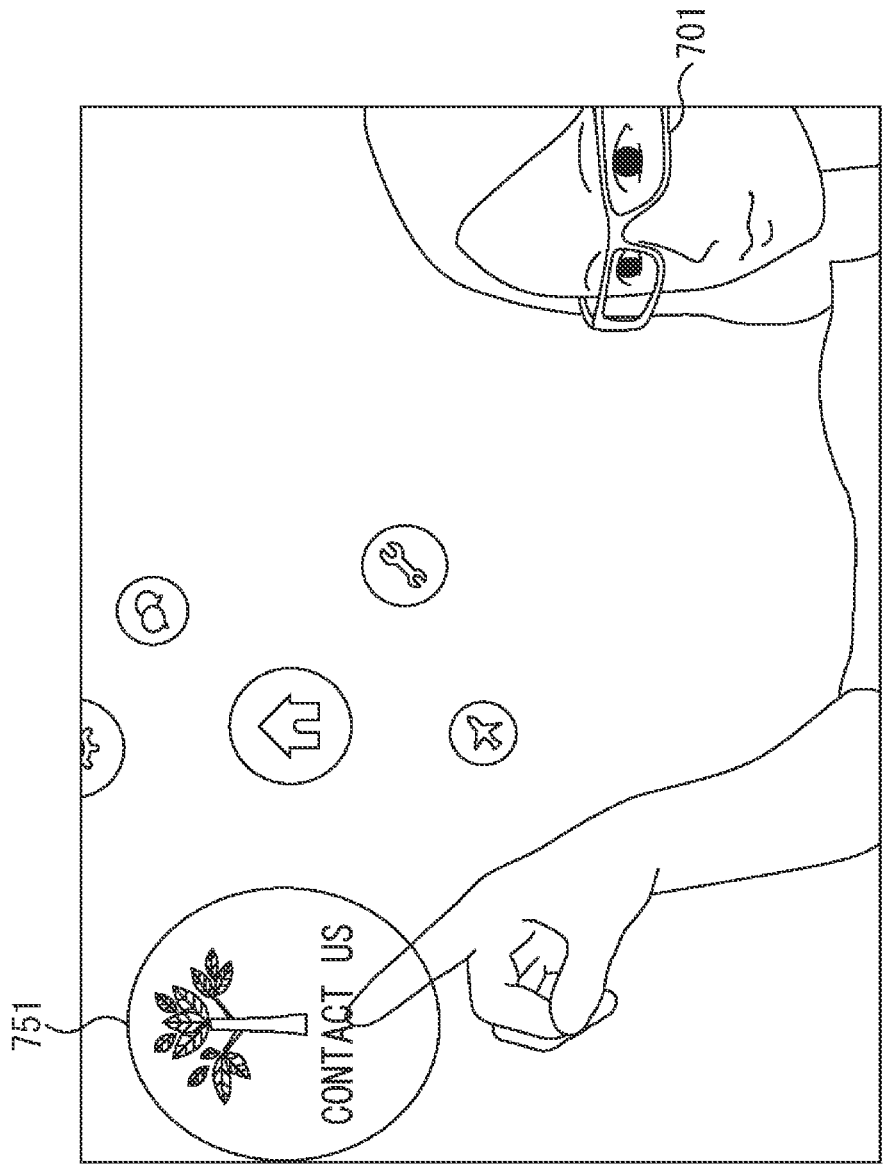
FIG. 21 is a view for explaining a usage example of the AR-HMD.

In a case where the user makes a gesture of touching information 751 displayed in a virtual space by using such an AR-HMD 701 as illustrated in FIG. 21, for example, information regarding the information is displayed.

For example, in a case where the information 751 displayed in the virtual space is a tree, the Fabry-Perot spectrometer 251 of the narrow-band imaging unit 120 is set with a wavelength band suitable for analyzing a state of the tree, imaging is performed, and an image obtained by the imaging and information obtained by analyzing the image are presented to the user.

The information 751 displayed in the virtual space may be information provided as AR content or may be an object in the real world imaged by the camera 712. For example, the tree as the information 751 described above may be a tree that grows in the real world and captured by the camera 712.

Furthermore, in addition to the gesture of touching the information 751, for example, a direction in which the user is directed, a direction in which a line-of-sight is directed, a direction in which the head is directed, and the like may be detected by the sensor unit 733. In other words, an operation of the user other than a gesture representing a direct instruction such as touching the information 751 may also be included in a part of a gesture for issuing an instruction, and such a gesture (an operation of the user) may be detected.

Furthermore, it is possible to detect a movement of the user and execute processing corresponding to the detection, for example, processing of acquiring information on an object in a line-of-sight direction of the user.

The AR-HMD 701 can be applied to analyze a human skin condition, image an affected part of a patient by being used as a medical device, and detect a predetermined object. Furthermore, information necessary for performing such analysis, for example, information about an appropriate wavelength band, and the like can be acquired from a server or the like on a cloud.

Furthermore, a configuration may also be adopted in which the analysis is performed by a server on a cloud, and an analysis result is received by the AR-HMD 701 and presented to the user. That is, the above-described analysis can be performed by an electronic device (a data analysis unit included in the electronic device) other than the imaging device 100, and the analysis can be performed via such an electronic device.

<About Recording Medium>

The series of processes described above can be executed by hardware or also executed by software. In a case where the series of processes are performed by software, a program that configures the software is installed in a computer. Here, examples of the computer include, for example, a computer that is built in dedicated hardware, a general-purpose personal computer that can perform various functions by being installed with various programs, and the like.

Figure 22:
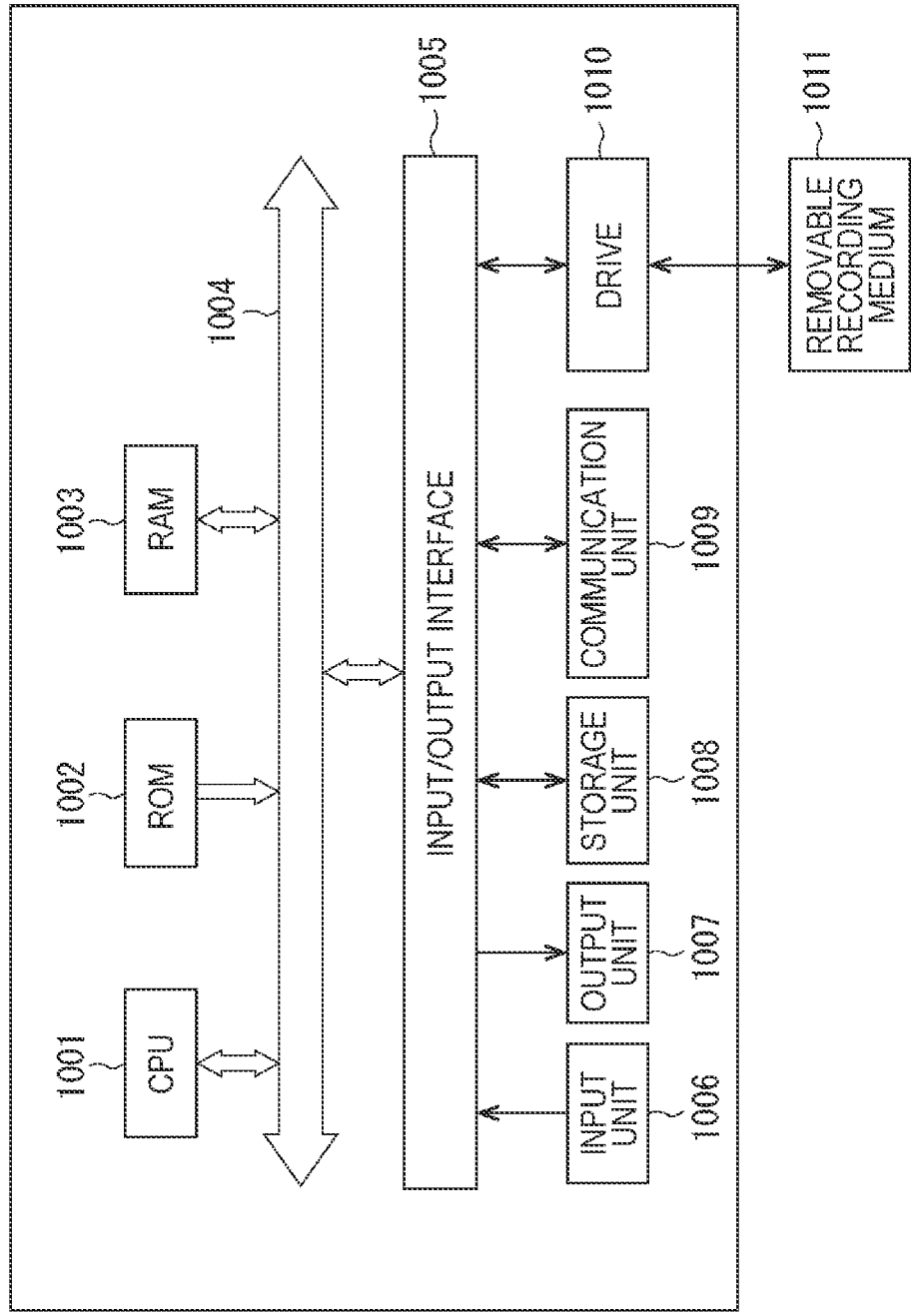
FIG. 22 is a diagram for explaining a recording medium.

FIG. 22 is a block diagram illustrating a configuration example of hardware of a computer that executes the series of processes described above in accordance with a program. In a computer, a central processing unit (CPU) 1001, a read only memory (ROM) 1002, and a random access memory (RAM) 1003 are mutually connected by a bus 1004. The bus 1004 is further connected with an input/output interface 1005. To the input/output interface 1005, an input unit 1006, an output unit 1007, a storage unit 1008, a communication unit 1009, and a drive 1010 are connected.

The input unit 1006 includes a keyboard, a mouse, a microphone, an imaging element, and the like. The output unit 1007 includes a display, a speaker, and the like. The storage unit 1008 includes a hard disk, a non-volatile memory, and the like. The communication unit 1009 includes a network interface or the like. The drive 1010 drives a removable medium 1011 such as a magnetic disk, an optical disk, a magneto-optical disk, or a semiconductor memory.

In the computer configured as described above, the series of processes described above are performed, for example, by the CPU 1001 loading a program recorded in the storage unit 1008 into the RAM 1003 via the input/output interface 1005 and the bus 1004, and executing.

The program executed by the computer (the CPU 1001) can be provided by being recorded on, for example, the removable medium 1011 as a package medium or the like. Furthermore, the program can be provided via a wired or wireless transmission medium such as a local area network, the Internet, or digital satellite broadcasting.

In the computer, by attaching the removable medium 1011 to the drive 1010, the program can be installed in the storage unit 1008 via the input/output interface 1005. Furthermore, the program can be received by the communication unit 1009 via a wired or wireless transmission medium, and installed in the storage unit 1008. Besides, the program can be installed in advance in the ROM 1002 and the storage unit 1008.

Note that the program executed by the computer may be a program that performs processing in time series according to an order described in this specification, or may be a program that performs processing in parallel or at necessary timing such as when a call is made.

Application Example to Endoscopic Surgery System

The technology (the present technology) according to the present disclosure can be applied to various products. For example, the technology according to the present disclosure may be applied to an endoscopic surgery system.

Figure 23:
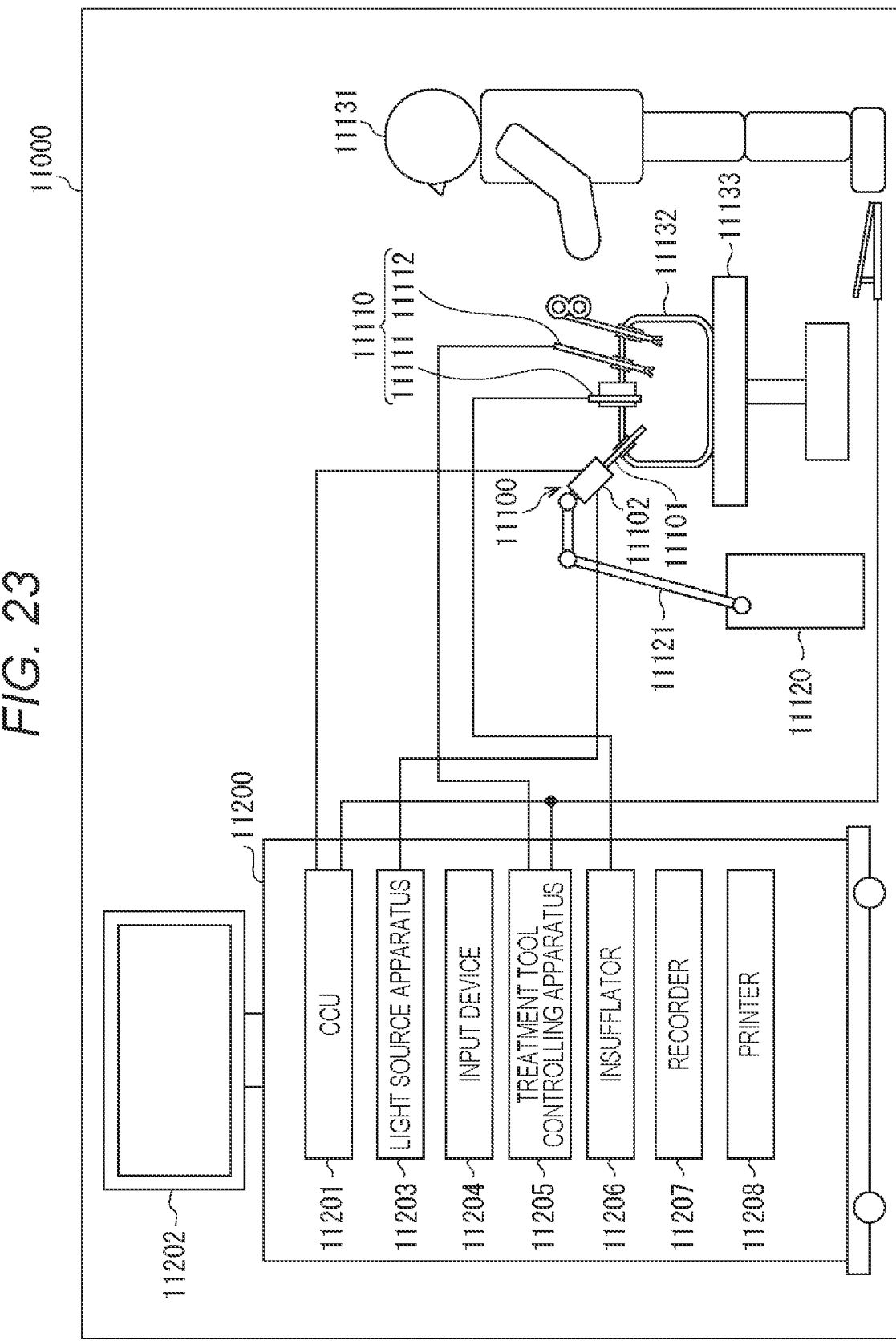
FIG. 23 is a view illustrating an example of a schematic configuration of an endoscopic surgery system.

FIG. 23 is a view illustrating an example of a schematic configuration of an endoscopic surgery system to which the technology (the present technology) according to the present disclosure can be applied.

FIG. 23 illustrates a state where a surgeon (a doctor) 11131 performs surgery on a patient 11132 on a patient bed 11133, by using an endoscopic surgery system 11000. As illustrated, the endoscopic surgery system 11000 includes an endoscope 11100, other surgical tools 11110 such as an insufflation tube 11111 and an energy treatment tool 11112, a supporting arm device 11120 which supports the endoscope 11100 thereon, and a cart 11200 on which various apparatuses for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the illustrated example, the endoscope 11100 is illustrated which includes as a rigid endoscope having the lens barrel 11101 of the hard type. However, the endoscope 11100 may otherwise be included as a flexible endoscope having the lens barrel 11101 of a flexible type.

The lens barrel 11101 has, at a distal end thereof, an opening in which an objective lens is fitted. The endoscope 11100 is connected with a light source apparatus 11203, and light generated by the light source apparatus 11203 is guided to the distal end of the lens barrel by a light guide extended inside the lens barrel 11101, and emitted toward an observation target in the body cavity of the patient 11132 through the objective lens. It is to be noted that the endoscope 11100 may be a forward-viewing endoscope or may be an oblique-viewing endoscope or a side-viewing endoscope.

An optical system and an imaging element are provided in the inside of the camera head 11102 such that reflected light (observation light) from the observation target is condensed on the imaging element by the optical system. The observation light is photoelectrically converted by the imaging element, and an electric signal corresponding to the observation light, in other words, an image signal corresponding to an observation image is generated. The image signal is transmitted as RAW data to a camera control unit (CCU) 11201.

The CCU 11201 includes a central processing unit (CPU), a graphics processing unit (GPU) or the like and integrally controls operation of the endoscope 11100 and a display apparatus 11202. Moreover, the CCU 11201 receives an image signal from the camera head 11102 and performs, on the image signal, various image processes for displaying an image based on the image signal such as, for example, a development process (a demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An input device 11204 is an input interface for the endoscopic surgery system 11000. A user can input various types of information and input instructions to the endoscopic surgery system 11000 via the input device 11204. For example, the user would input an instruction or a like to change an imaging condition (a type of irradiation light, a magnification, a focal distance, or the like) by the endoscope 11100.

A treatment tool controlling apparatus 11205 controls driving of the energy treatment tool 11112 for cautery or incision of a tissue, sealing of a blood vessel, or the like. An insufflator 11206 sends gas into a body cavity through the insufflation tube 11111 in order to inflate the body cavity of the patient 11132 for the purpose of securing a visual field by the endoscope 11100 and securing a working space of the surgeon. A recorder 11207 is a device capable of recording various types of information regarding the surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source including, for example, an LED, a laser light source, or a combination of them. In a case where a white light source includes a combination of red, green, and blue (RGB) laser light sources, since the output intensity and the output timing can be controlled with a high degree of accuracy for each color (each wavelength), adjustment of the white balance of a captured image can be performed by the light source apparatus 11203. Furthermore, in this case, it is also possible to capture an image corresponding to each of RGB in a time division manner by irradiating the observation target with laser light from each of the RGB laser light sources in a time-division manner, and controlling driving of the imaging element of the camera head 11102 in synchronization with the irradiation timing. According to this method, a color image can be obtained even if color filters are not provided for the imaging element.

Furthermore, the light source apparatus 11203 may be controlled such that the intensity of light to be outputted is changed for each predetermined time. By controlling driving of the imaging element of the camera head 11102 in synchronization with the timing of the change of the intensity of light to acquire images time-divisionally and synthesizing the images, an image of a high dynamic range free from underexposed blocked up shadows and overexposed highlights can be created.

Furthermore, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In the fluorescence observation, it is possible to perform irradiating a body tissue with excitation light and observing fluorescence from the body tissue (autofluorescence observation), locally injecting a reagent such as indocyanine green (ICG) into a body tissue and irradiating the body tissue with excitation light corresponding to the fluorescence wavelength of the reagent to obtain a fluorescent image, or the like. The light source apparatus 11203 can be configured to supply such narrow-band light and/or excitation light suitable for special light observation as described above.

Figure 24:
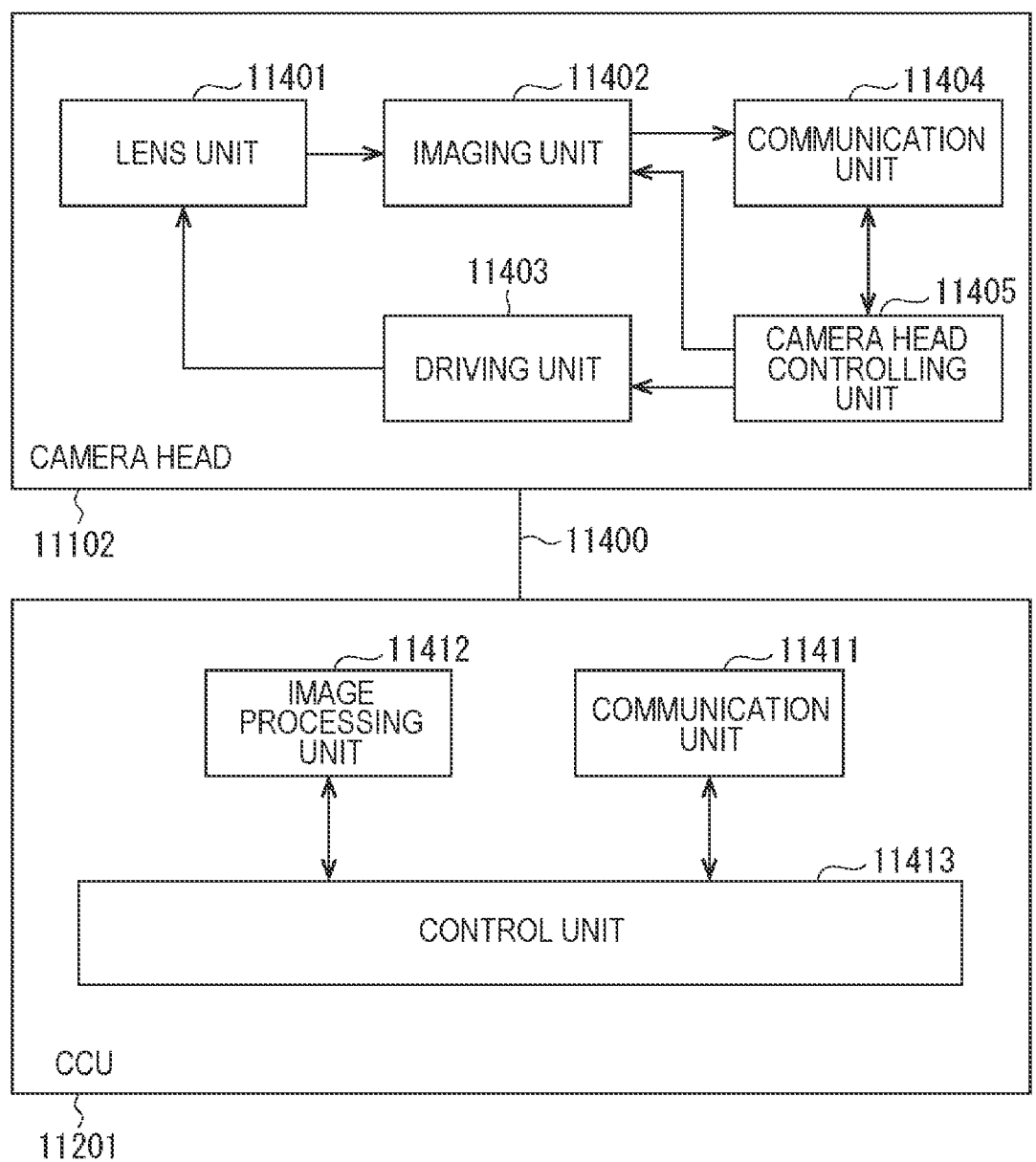
FIG. 24 is a block diagram illustrating an example of a functional configuration of a camera head and a CCU.

FIG. 24 is a block diagram illustrating an example of a functional configuration of the camera head 11102 and the CCU 11201 illustrated in FIG. 23.

The camera head 11102 includes a lens unit 11401, an imaging unit 11402, a driving unit 11403, a communication unit 11404 and a camera head controlling unit 11405. The CCU 11201 has a communication unit 11411, an image processing unit 11412, and a control unit 11413. The camera head 11102 and the CCU 11201 are connected for communication to each other by a transmission cable 11400.

The lens unit 11401 is an optical system, provided at a connecting location to the lens barrel 11101. Observation light taken in from the distal end of the lens barrel 11101 is guided to the camera head 11102 and is incident on the lens unit 11401. The lens unit 11401 includes a combination of a plurality of lenses including a zoom lens and a focusing lens.

The number of imaging elements which is included by the imaging unit 11402 may be one (single-plate type) or a plural number (multi-plate type). In a case where the imaging unit 11402 is configured with the multi-plate type, for example, individual imaging elements may generate image signals corresponding to RGB each, and a color image may be obtained by synthesizing them. Alternatively, the imaging unit 11402 may have a pair of imaging elements for respectively acquiring image signals for the right eye and the left eye corresponding to three-dimensional (3D) display. Performing 3D display enables the surgeon 11131 to more accurately grasp a depth of living tissues in the surgical region. It is to be noted that, in a case where the imaging unit 11402 is configured as that of stereoscopic type, a plurality of systems of lens units 11401 is provided corresponding to the individual imaging elements.

Furthermore, the imaging unit 11402 may not necessarily be provided on the camera head 11102. For example, the imaging unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a captured image by the imaging unit 11402 can be adjusted suitably.

The communication unit 11404 includes a communication device for transmitting and receiving various kinds of information to and from the CCU 11201. The communication unit 11404 transmits an image signal acquired from the imaging unit 11402 as RAW data to the CCU 11201 through the transmission cable 11400.

Furthermore, the communication unit 11404 receives a control signal for controlling driving of the camera head 11102 from the CCU 11201 and supplies the control signal to the camera head controlling unit 11405. The control signal includes information relating to imaging conditions such as, for example, information that a frame rate of a captured image is designated, information that an exposure value upon imaging is designated and/or information that a magnification and a focal point of a captured image are designated.

It is to be noted that the imaging conditions such as the frame rate, the exposure value, the magnification, or the focal point described above may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication device for transmitting and receiving various kinds of information to and from the camera head 11102. The communication unit 11411 receives an image signal transmitted thereto from the camera head 11102 through the transmission cable 11400.

Furthermore, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to imaging of a surgical region or the like by the endoscope 11100 and display of a captured image obtained by imaging of the surgical region or the like. For example, the control unit 11413 creates a control signal for controlling driving of the camera head 11102.

Furthermore, the control unit 11413 controls, on the basis of an image signal for which image processes have been performed by the image processing unit 11412, the display apparatus 11202 to display a captured image in which the surgical region or the like is imaged. At this time, the control unit 11413 recognizes various objects in the captured image by using various image recognition techniques. For example, by detecting a shape, a color, and the like of an edge of the object included in the captured image, the control unit 11413 can recognize a surgical tool such as forceps, a specific living site, bleeding, mist in using the energy treatment tool 11112, and the like. When causing the display apparatus 11202 to display the captured image, the control unit 11413 may use the recognition result to superimpose and display various types of surgery supporting information on the image of the surgical region. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the illustrated example, communication is performed by wired communication using the transmission cable 11400, the communication between the camera head 11102 and the CCU 11201 may be performed by wireless communication.

Application Example to Mobile Body

The technology (the present technology) according to the present disclosure can be applied to various products. For example, the technology according to the present disclosure may be realized as a device equipped on any type of mobile bodies, such as an automobile, an electric car, a hybrid electric car, a motorcycle, a bicycle, personal mobility, an airplane, a drone, a ship, a robot, and the like.

Figure 25:
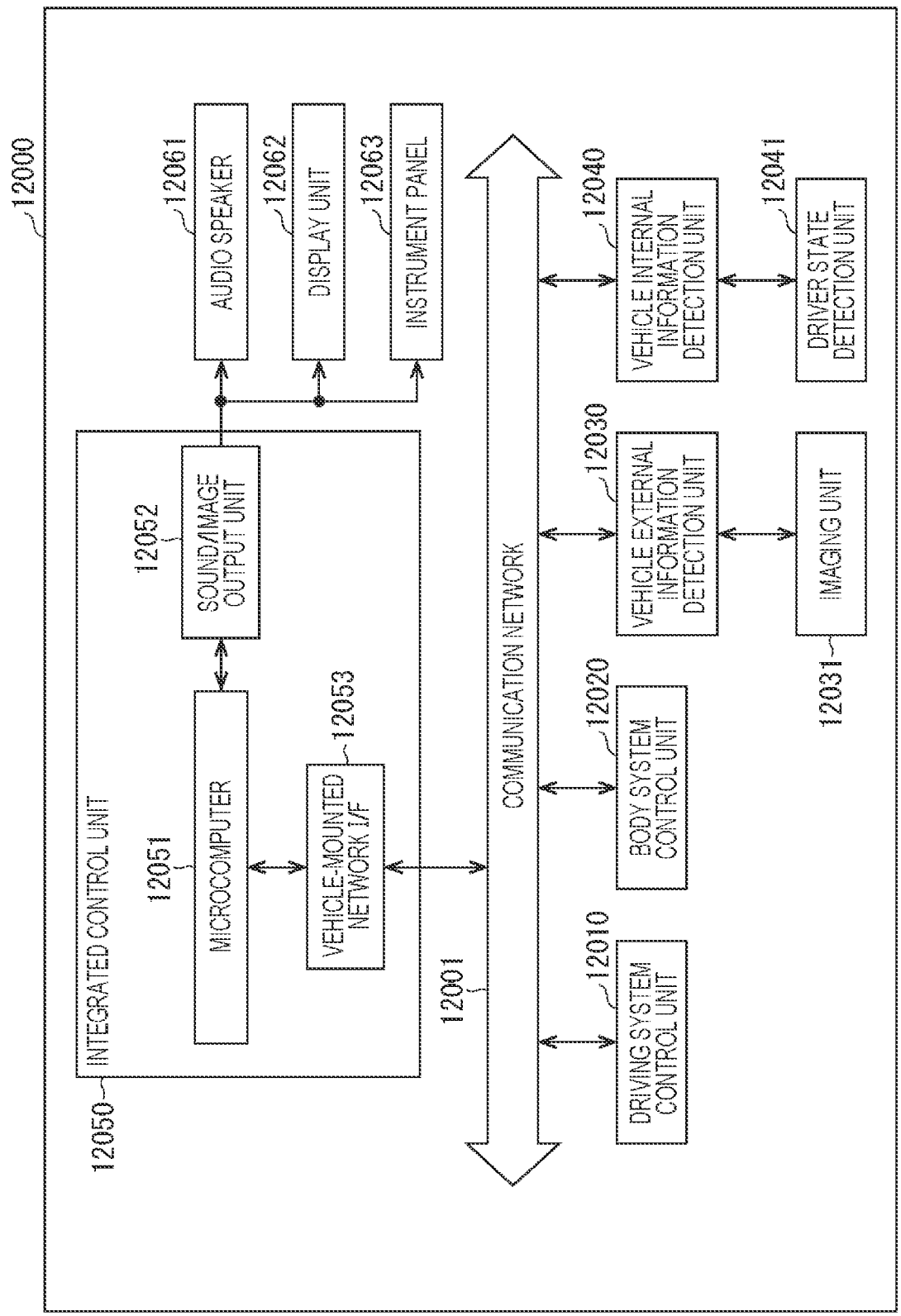
FIG. 25 is a block diagram illustrating an example of schematic configuration of a vehicle control system.

FIG. 25 is a block diagram illustrating an example of a schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example illustrated in FIG. 25, the vehicle control system 12000 includes a driving system control unit 12010, a body system control unit 12020, a vehicle external information detection unit 12030, a vehicle internal information detection unit 12040, and an integrated control unit 12050. Furthermore, a microcomputer 12051, a sound/image output unit 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various lamps such as a headlamp, a back lamp, a brake lamp, a turn indicator, or a fog lamp. In this case, the body system control unit 12020 may be inputted with radio waves or signals of various switches transmitted from a portable device that substitutes for a key. The body system control unit 12020 receives these input radio waves or signals, and controls a door lock device, the power window device, the lamps, or the like of the vehicle.

The vehicle external information detection unit 12030 detects information about the outside of the vehicle including the vehicle control system 12000. For example, to the vehicle external information detection unit 12030, an imaging unit 12031 is connected. The vehicle external information detection unit 12030 causes the imaging unit 12031 to capture an image of an outside of the vehicle, and receives the captured image. On the basis of the received image, the vehicle external information detection unit 12030 may perform processing of detecting an object such as a human, a vehicle, an obstacle, a sign, a character on a road surface, or the like, or processing of detecting a distance thereto.

The imaging unit 12031 is an optical sensor that receives light, and which outputs an electric signal corresponding to a received light amount of the light. The imaging unit 12031 can output the electric signal as an image, or can output as distance measurement information. Furthermore, the light received by the imaging unit 12031 may be visible light, or may be invisible light such as infrared rays or the like.

The vehicle internal information detection unit 12040 detects information about the inside of the vehicle. The vehicle internal information detection unit 12040 is connected with, for example, a driver state detection unit 12041 that detects a state of a driver. The driver state detection unit 12041, for example, includes a camera that images the driver. On the basis of detection information inputted from the driver state detection unit 12041, the vehicle internal information detection unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the vehicle external information detection unit 12030 or the vehicle internal information detection unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

Furthermore, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the vehicle external information detection unit 12030 or the vehicle internal information detection unit 12040.

Furthermore, the microcomputer 12051 can output a control command to the body system control unit 12030 on the basis of the information about the outside of the vehicle which information is obtained by the vehicle external information detection unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the vehicle external information detection unit 12030.

The sound/image output unit 12052 transmits an output signal of at least one of a sound and an image to an output device capable of visually or auditorily notifying information to an occupant of the vehicle or the outside of the vehicle. In the example of FIG. 25, an audio speaker 12061, a display unit 12062, and an instrument panel 12063 are illustrated as the output device. The display unit 12062 may, for example, include at least one of an on-board display and a head-up display.

Figure 26:
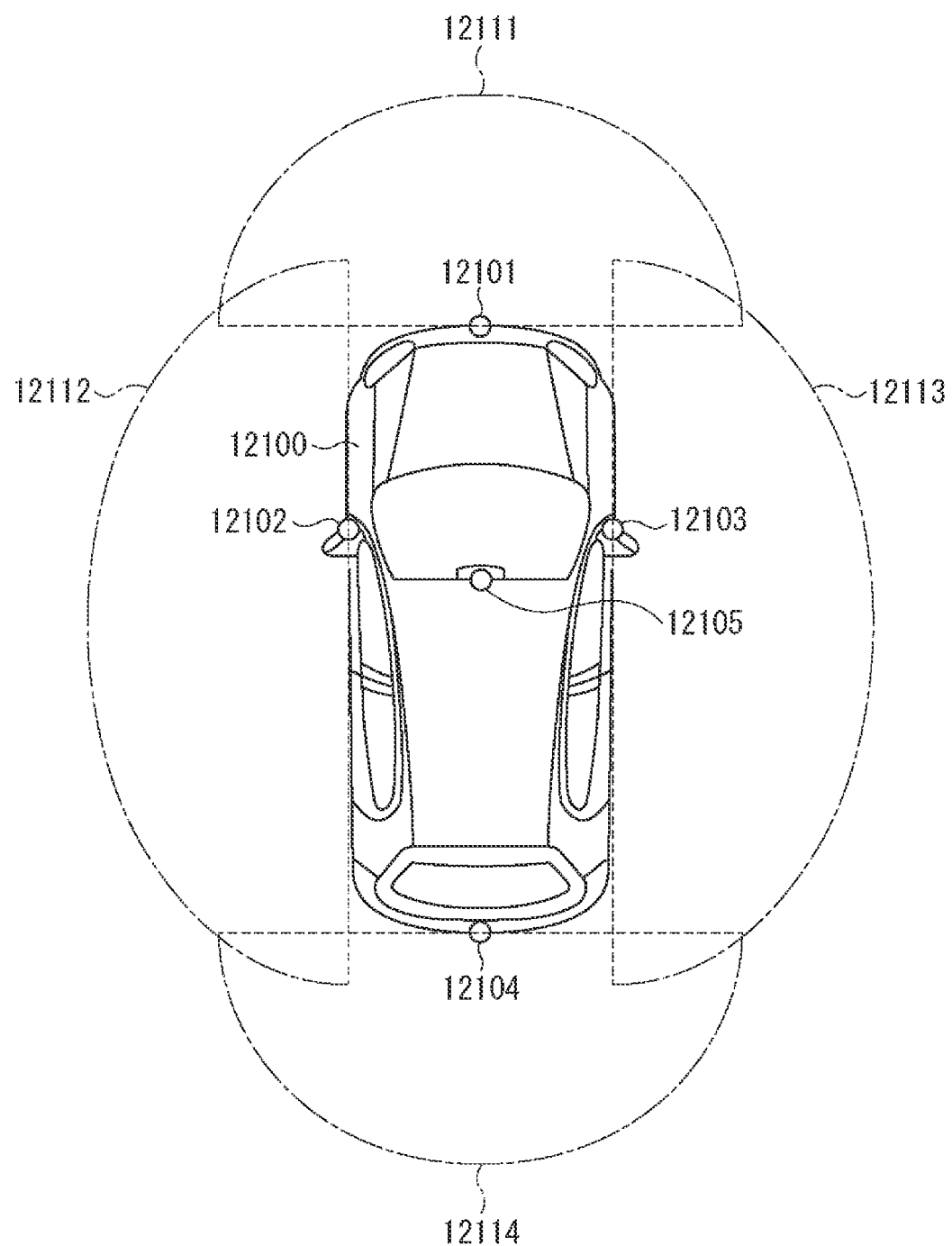
FIG. 26 is an explanatory view illustrating an example of an installation position of a vehicle external information detection unit and an imaging unit.

FIG. 26 is a view illustrating an example of the installation position of the imaging unit 12031.

In FIG. 26, the imaging unit 12031 includes imaging units 12101, 12102, 12103, 12104, and 12105.

The imaging units 12101, 12102, 12103, 12104, and 12105 are, for example, disposed at positions on a front nose, sideview mirrors, a rear bumper, and a back door of a vehicle 12100 as well as a position on an upper portion of a windshield within a vehicle cabin. The imaging unit 12101 provided at the front nose and the imaging unit 12105 provided at the upper part of the windshield in the vehicle cabin mainly acquire an image in front of the vehicle 12100. The imaging units 12102 and 12103 provided at the side mirrors mainly acquire an image of a side of the vehicle 12100. The imaging unit 12104 provided at the rear bumper or the back door mainly acquires an image behind the vehicle 12100. The imaging unit 12105 provided to the upper portion of the windshield within the vehicle cabin is used mainly to detect a preceding vehicle, a pedestrian, an obstacle, a signal, a traffic sign, a lane, or the like.

Note that, FIG. 26 illustrates an example of imaging ranges of the imaging units 12101 to 12104. An imaging range 12111 represents an imaging range of the imaging unit 12101 provided to the front nose. Imaging ranges 12112 and 12113 respectively represent imaging ranges of the imaging units 12102 and 12103 provided to the sideview mirrors. An imaging range 12114 represents an imaging range of the imaging unit 12104 provided to the rear bumper or the back door. A bird's-eye image of the vehicle 12100 as viewed from above is obtained by superimposing image data imaged by the imaging units 12101 to 12104, for example.

At least one of the imaging units 12101 to 12104 may have a function of obtaining distance information. For example, at least one of the imaging units 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging units 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Moreover, the microcomputer 12051 can set an inter-vehicle distance to be secured from a preceding vehicle in advance, and perform automatic brake control (including follow-up stop control), automatic acceleration control (including follow-up start control), and the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging units 12101 to 12104, extract the classified three-dimensional object data, and use the extracted three-dimensional object data for automatic avoidance of an obstacle. For example, the microcomputer 12051 distinguishes obstacles around the vehicle 12100 into obstacles that are visible to the driver of the vehicle 12100 and obstacles that are difficult to see. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display unit 12062, and performs forced deceleration or avoidance steering via the driving system control unit 12010. The microcomputer 12051 can thereby assist in driving to avoid collision.

At least one of the imaging units 12101 to 12104 may be an infrared camera that detects infrared rays. For example, the microcomputer 12051 can recognize a pedestrian by determining whether or not a pedestrian exists in a captured image of the imaging units 12101 to 12104. Such recognition of a pedestrian is performed by, for example, a procedure of extracting a feature point in a captured image of the imaging unit 12101 to 12104 as an infrared camera, and a procedure of performing pattern matching processing on a series of feature points indicating a contour of an object and determining whether or not the object is a pedestrian. When the microcomputer 12051 determines that a pedestrian is present in the image captured by the imaging units 12101 to 12104 and recognizes the pedestrian, the sound/image output unit 12052 controls the display unit 12062 so as to superimpose and display a rectangular contour line for emphasis on the recognized pedestrian. Furthermore, the sound/image output unit 12052 may also control the display unit 12062 so that an icon or the like representing the pedestrian is displayed at a desired position.

Furthermore, in the present specification, the system represents the entire device including a plurality of devices.

Note that the effects described in this specification are merely examples and are not limited, and other effects may also be present.

Note that the embodiment of the present technology is not limited to the above-described embodiment, and various modifications can be made without departing from the scope of the present technology.

Note that the present technology can also have the following configurations.

(1)

An imaging device including:

two or more imaging units capable of imaging or sensing a same subject, in which at least one first imaging unit among the two or more imaging units includes a first filter configured to transmit a plurality of wavelength bands, and at least another one second imaging unit other than the first imaging unit among the two or more imaging units includes a second filter capable of varying a wavelength band.

(2)

The imaging device according to (1), in which the second imaging unit has a narrower band than the first imaging unit.

(3)

The imaging device according to (1) or (2), in which the second filter is a Fabry-Perot spectrometer.

(4)

The imaging device according to (3), in which the Fabry-Perot spectrometer is formed by micro electro mechanical systems (MEMS) that can be driven by a voltage.

(5)

The imaging device according to any one of (1) to (4), in which the first filter is a color filter, and a wavelength band of the second filter is set to a wavelength band of a color for interpolation of a color acquired by the color filter.

(6)

The imaging device according to (1), in which the first imaging unit has four or more wavelength bands, and optical control using plasmon resonance is used for the four or more wavelength bands.

(7)

The imaging device according to any one of (1) to (6), in which an organic photoelectric conversion film is used for at least one imaging unit among the two or more imaging units.

(8)

The imaging device according to any one of (1) to (7), in which a subject is estimated by using an image captured by the first imaging unit, and a wavelength band of the second filter is set to a wavelength band suitable for imaging the subject that has been estimated.

(9)

The imaging device according to (8), in which the subject is estimated using a synthesized image obtained by synthesizing an image captured by the first imaging unit and an image captured by the second imaging unit.

(10)

The imaging device according to any one of (1) to (9), in which an image captured by the first imaging unit is corrected with color information acquired by the second imaging unit.

(11)

The imaging device according to any one of (1) to (10), in which a distribution of color information of an image captured by the second imaging unit is compared with a distribution of color information of an image captured by the first imaging unit, and a correction amount for correction of an image captured by the second imaging unit is set.

(12)

The imaging device according to any one of (1) to (11), in which moving subject correction is performed on a result of the second imaging unit by using an output obtained from the first imaging unit.

(13)

The imaging device according to any one of (1) to (12), in which object analysis and state analysis are performed using results obtained from the two or more imaging units.

(14)

The imaging device according to (13), in which analysis is performed on a result obtained from any one imaging unit among the two or more imaging units or a result obtained by synthesizing results obtained from the two or more imaging units, via another electronic device at a communication destination.

(15)

The imaging device according to (14), in which a wavelength band of the second filter is designated by the another electronic device.

(16)

The imaging device according to any one of (1) to (15), in which a wavelength band of the first filter is a visible-light band, and a wavelength band of the second filter is an ultraviolet light band, a visible light band, or an infrared light band.

(17)

The imaging device according to any one of (1) to (16), in which the imaging device is included in any of devices that provide augmented reality (AR), virtual reality (VR), and mixed reality (MR).

(18)

The imaging device according to any one of (1) to (17), in which the first imaging unit and the second imaging unit perform imaging in synchronization with each other.

(19)

An imaging method in which an imaging device includes:

two or more imaging units capable of imaging or sensing a same subject, in which at least one first imaging unit among the two or more imaging units includes a first filter configured to transmit a plurality of wavelength bands, and at least another one second imaging unit other than the first imaging unit among the two or more imaging units includes a second filter capable of varying a wavelength band, the imaging method including:

estimating the subject by using a synthesized image obtained by synthesizing an image captured by the first imaging unit and an image captured by the second imaging unit.

(20)

An electronic device including:

an imaging device including two or more imaging units capable of imaging or sensing a same subject, in which at least one first imaging unit among the two or more imaging units includes a first filter configured to transmit a plurality of wavelength bands, and at least another one second imaging unit other than the first imaging unit among the two or more imaging units includes a second filter capable of varying a wavelength band; and a processing unit configured to process a signal from the imaging device.

REFERENCE SIGNS LIST

10 Compound-eye camera module
21 Monocular camera module
522 Connecting member
100 Imaging device
110 Wide-band imaging unit
111 Lens
112 Wide-band photoelectric conversion unit
113 A/D conversion unit
114 Clamp unit
115 Color-specific output unit
116 Defect correction unit
117 Linear matrix unit
120 Narrow-band imaging unit
121 Lens
122 Narrow-band photoelectric conversion unit
123 A/D conversion unit
131 Processing unit
132 Image output unit
134 Memory
135 Communication unit
151 Server
202 Pixel
203 Pixel region
204 Vertical drive circuit
205 Column signal processing circuit
206 Horizontal drive circuit unit
207 Output circuit
208 Control circuit
209 Vertical signal line
210 Horizontal signal line
212 Input/output terminal
251 Fabry-Perot spectrometer
252 Semitransparent mirror
253 Semitransparent mirror
311, 312, 313 Image
321, 322 Image
323 Synthesized image
401 Wall surface
411, 412 Image

The invention claimed is:

1. An imaging device comprising:
a first imaging unit configured to image or sense a subject, the first imaging unit including a first filter configured to transmit a plurality of wavelength bands; and
a second imaging unit configured to image or sense the subject, the second imaging unit including a second filter configured to have a wavelength band that is variable, wherein
the first filter is a color filter,
the wavelength band of the second filter is set to a color wavelength band configured for interpolation of a color acquired by the color filter, and
wherein a distribution of color information of an image captured by the second imaging unit is compared with a distribution of color information of an image captured by the first imaging unit, and a correction amount for correction of the image captured by the second imaging unit is set.

2. The imaging device according to claim 1, wherein the second imaging unit has a narrower band than the first imaging unit.

3. The imaging device according to claim 1, wherein the second filter is a Fabry-Perot spectrometer.

4. The imaging device according to claim 3, wherein the Fabry-Perot spectrometer is formed by micro electro mechanical systems (MEMS) that can be driven by a voltage.

5. The imaging device according to claim 1, wherein the first imaging unit has four or more wavelength bands, and optical control using plasmon resonance is used for the four or more wavelength bands.

6. The imaging device according to claim 1, wherein an organic photoelectric conversion film is used for at least the first imaging unit.

7. The imaging device according to claim 1, wherein an image captured by the first imaging unit is corrected with color information acquired by the second imaging unit.

8. The imaging device according to claim 1, wherein object analysis and state analysis are performed using results obtained from the first and second imaging units.

9. The imaging device according to claim 8, wherein analysis is performed on a result obtained from either the first imaging unit or the second imaging unit or a result obtained by synthesizing results obtained from the first and second imaging units, via another electronic device at a communication destination.

10. The imaging device according to claim 9, wherein the wavelength band of the second filter is designated by the another electronic device.

11. The imaging device according to claim 1, wherein a wavelength band of the first filter is a visible-light band, and the wavelength band of the second filter is an ultraviolet light band, a visible light band, or an infrared light band.

12. The imaging device according to claim 1, wherein the imaging device is included in any of devices that provide augmented reality (AR), virtual reality (VR), and mixed reality (MR).

13. The imaging device according to claim 1, wherein the first imaging unit and the second imaging unit perform imaging in synchronization with each other.

14. An imaging device comprising:
a first imaging unit configured to image or sense a subject, the first imaging unit including a first filter configured to transmit a plurality of wavelength bands; and
a second imaging unit configured to image or sense the subject, the second imaging unit including a second filter configured to have a wavelength band that is variable, wherein
the first filter is a color filter,
the wavelength band of the second filter is set to a color wavelength band configured for interpolation of a color acquired by the color filter,
the subject is an estimated subject that is estimated by using an image captured by the first imaging unit, and
the wavelength band of the second filter is set to a predetermined wavelength band suitable for imaging the estimated subject.

15. The imaging device according to claim 14, wherein the subject is estimated using a synthesized image obtained by synthesizing the image captured by the first imaging unit and an image captured by the second imaging unit.

16. An imaging device comprising:
a first imaging unit configured to image or sense a subject, the first imaging unit including a first filter configured to transmit a plurality of wavelength bands; and a second imaging unit configured to image or sense the subject, the second imaging unit including a second filter configured to have a wavelength band that is variable, wherein the first filter is a color filter, the wavelength band of the second filter is set to a color wavelength band configured for interpolation of a color acquired by the color filter, and moving subject correction is performed for the second imaging unit by using an output obtained from the first imaging unit.

17. An electronic device comprising:

an imaging device according to claim 1, and a processor configured to process a signal from the imaging device, wherein the imaging device comprises a first imaging unit configured to image or sense a subject, the first imaging unit including a first filter configured to transmit a plurality of wavelength bands; and a second imaging unit configured to image or sense the subject, the second imaging unit including a second filter configured to have a wavelength band that is variable, wherein the first filter is a color filter, the wavelength band of the second filter is set to a color wavelength band configured for interpolation of a color acquired by the color filter, and the processor is configured to estimate the subject by using a synthesized image obtained by synthesizing an image captured by the first imaging unit and an image captured by the second imaging unit.

* * * * *